United States Patent
Van Aken

(10) Patent No.: US 8,626,989 B2
(45) Date of Patent: Jan. 7, 2014

(54) CONTROL ARRANGEMENTS AND METHODS FOR ACCESSING BLOCK ORIENTED NONVOLATILE MEMORY

(75) Inventor: Stephen P. Van Aken, Boulder, CO (US)

(73) Assignee: Micron Technology, Inc., Boise, ID (US)

( * ) Notice: Subject to any disclaimer, the term of this patent is extended or adjusted under 35 U.S.C. 154(b) by 358 days.

(21) Appl. No.: 13/019,969

(22) Filed: Feb. 2, 2011

(65) Prior Publication Data

US 2012/0198128 A1    Aug. 2, 2012

(51) Int. Cl.
*G06F 12/00* (2006.01)
*G06F 12/02* (2006.01)
*G06F 12/06* (2006.01)
*G11C 16/06* (2006.01)

(52) U.S. Cl.
USPC ..... 711/103; 711/154; 711/201; 711/E12.008

(58) Field of Classification Search
None
See application file for complete search history.

(56) References Cited

U.S. PATENT DOCUMENTS

| | | | |
|---|---|---|---|
| 6,684,289 B1 * | 1/2004 | Gonzalez et al. | 711/103 |
| 7,032,065 B2 * | 4/2006 | Gonzalez et al. | 711/103 |
| 7,171,513 B2 * | 1/2007 | Gonzalez et al. | 711/103 |
| 7,716,448 B2 | 5/2010 | Schneider | |
| 8,364,929 B2 * | 1/2013 | Haines et al. | 711/171 |
| 2009/0276601 A1 | 11/2009 | Kancherla | |
| 2010/0057978 A1 | 3/2010 | Takamura et al. | |
| 2010/0174851 A1 | 7/2010 | Leibowitz et al. | |
| 2011/0099321 A1 * | 4/2011 | Haines et al. | 711/103 |

OTHER PUBLICATIONS

Mark LaPedus, Micron Clears Up NAND with Integrated Part, Dec. 2, 2010, EE Times News & Analysis.
The International Search Report and the Written Opinion of the International Searching Authority for International Application No. PCT/US2012/021560 which is associated with U.S. Appl. No. 13/019,969, Jul. 30, 2012, Republic of Korea.

* cited by examiner

*Primary Examiner* — Kevin Verbrugge
(74) *Attorney, Agent, or Firm* — Pritzkou Patent Group, LLC

(57) ABSTRACT

A read/write arrangement is described for use in accessing at least one nonvolatile memory device in read/write operations with the memory device being made up of a plurality of memory cells which memory cells are organized as a set of pages that are physically and sequentially addressable with each page having a page length such that a page boundary is defined between successive ones of the pages in the set. The read/write arrangement includes a control arrangement that is configured to store and access a group of data blocks that is associated with a given write operation in a successive series of pages of the memory such that at least an initial page in the series is filled and each block includes a block length that is different than the page length.

31 Claims, 15 Drawing Sheets

WEAR LEVELING

GARBAGE COLLECTION

BIT DENSITY CONFIGURATION

FTL FUNCTION

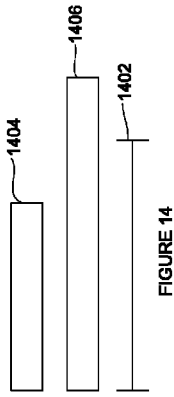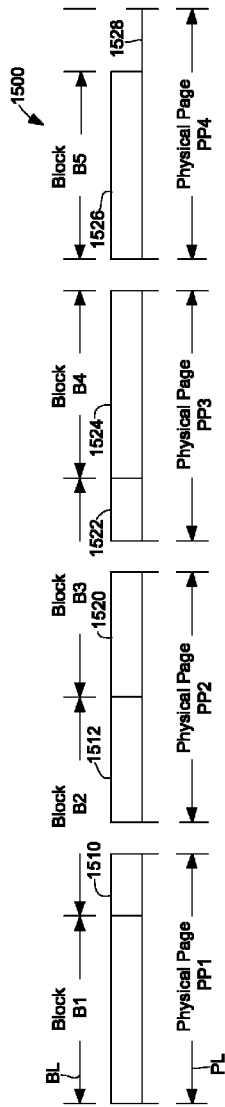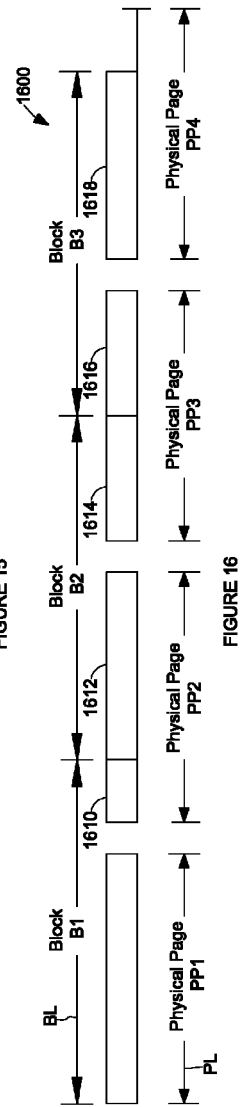

CONTROL ARRANGEMENTS AND METHODS FOR ACCESSING BLOCK ORIENTED NONVOLATILE MEMORY

The present invention is related generally to the field of memory systems using non-volatile memory, such as solid-state drives ("SSDs") and other storage devices, and, more particularly, to control arrangements and methods for accessing block oriented nonvolatile memory.

Prior art solid state drives typically include a controller that can be interfaced with a standard host device as well as a plurality of flash memory devices. The flash memory devices are generally each in the form of a memory die. The connection between the controller and the flash memory devices is typically in the form of a flash-oriented interface with each memory device being individually connected to the flash-oriented interface. The controller may have a plurality of flash-oriented interfaces with each of these interfaces being connected to a plurality of memory devices. Applicants recognize that there are a number of disadvantages with respect to this prior art configuration, particularly with respect to larger capacity solid-state drives. For example, the controller must control a large number of individual memory devices. As another example, the number of signal connection points that are required on the controller increase in proportion to the capacity of the drive. In still another example, the controller is responsible for management functions (e.g., overhead functions, such as wear leveling) such that the interface between the controller and the memory devices is burdened by traffic relating to these functions. As yet another example, testing and monitoring of large numbers of memory devices by the controller is a complex task.

Applicants also recognize a related concern with respect to the use of non-volatile memory in the prior art with regard to block-oriented non-volatile memory. It should be appreciated that the prevailing approach of the prior art with respect to access of block-oriented non-volatile memory is to allocate user data plus accompanying extra information exactly onto a physical page. For purposes of the present discussions, the term "block-oriented" relates to the use of a page based memory that is employed by using user data blocks that are generally of a length that is equal to the page length. As will be further discussed, with block-oriented memory, some pages may be partially unused based on a user data block that is shorter than one page length, but user data blocks are not longer than the page length. By way of non-limiting example, NAND flash is typically configured so as to be of this type of block-oriented memory. This type of inflexible allocation in block-oriented memory thus produces an exact correspondence between the stored information and the number of storage cells comprising each physical page and is customary within the industry for both Single Bit per Cell memory (SBC) and Multi-Bit per Cell memory (MBC).

Applicants further recognize that such an approach is inflexible in matching user data to page-units in a particular memory device. The physical page size is a design parameter of the memory and cannot be changed. A penalty will be incurred in the event of a mismatch between the number of storage cells in a physical page and the number of cells required per block by an application. The penalty can be in the form of insufficient cells to meet ECC requirements, thus leading to poor reliability of the application; or it can be in the form of storage inefficiency if there are a more than the needed number of cells in each physical page. Thus, designers of non-volatile memory devices, e.g., NAND flash, are challenged with attempting to predict the needed page size before the memory is even produced. Almost inevitably, a given page size will be not be well-suited to at least some subset of the applications to which the use of the memory is directed.

The foregoing examples of the related art and limitations related therewith are intended to be illustrative and not exclusive. Other limitations of the related art will become apparent to those of skill in the art upon a reading of the specification and a study of the drawings.

BRIEF DESCRIPTION OF THE DRAWINGS

Exemplary embodiments are illustrated in referenced figures of the drawings. It is intended that the embodiments and figures disclosed herein are to be illustrative rather than limiting.

FIG. 14 is a diagrammatic illustration of user data blocks of differing length in relation to the length of a physical page.

FIG. 15 is a block diagram which diagrammatically illustrates a set of successive physical pages storing a set of user data blocks each of which includes a length that is less than the length of one physical page.

FIG. 16 is a block diagram which diagrammatically illustrates a set of successive physical pages storing a set of user data blocks each of which includes a length that is greater than the length of one physical page.

DETAILED DESCRIPTION

The following description is presented to enable one of ordinary skill in the art to make and use the invention and is provided in the context of a patent application and its requirements. Various modifications to the described embodiments will be readily apparent to those skilled in the art and the generic principles taught herein may be applied to other embodiments. Thus, the present invention is not intended to be limited to the embodiments shown, but is to be accorded the widest scope consistent with the principles and features described herein including modifications and equivalents, as defined within the scope of the appended claims. It is noted that the drawings are not to scale and are diagrammatic in nature in a way that is thought to best illustrate features of interest. Descriptive terminology may be adopted for purposes of enhancing the reader's understanding, with respect to the various views provided in the figures, and is in no way intended as being limiting.

Figure 1:
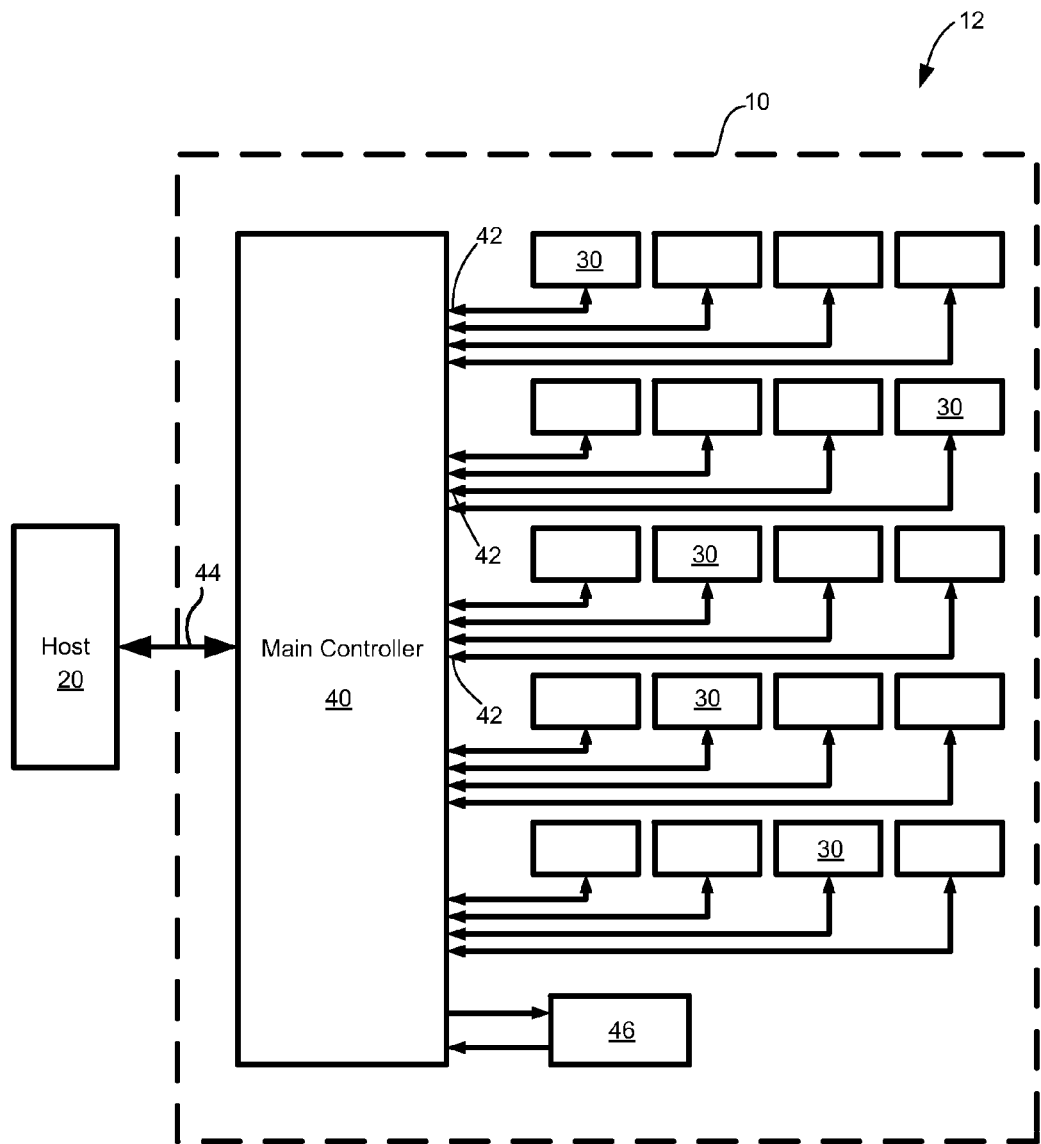
FIG. 1 is a block diagram which illustrates an SSD that is produced according to an embodiment of the present disclosure, shown here as part of an overall system.

Attention is now directed to the figures wherein like items may refer to like components throughout the various views. FIG. 1 is a block diagram of a solid state drive (SSD) 10, produced according to an embodiment of the present disclosure, forming part of an overall system 12 wherein the solid state drive is interfaced with a host 20. In the example embodiment of FIG. 2, storage capacity of the SSD 10 is provided by a total of 20 modules some of which are designated by the reference number 30. Any suitable number of modules can be used while remaining within the scope of the teachings herein. Each module includes a non-volatile memory ("NVM") section (e.g., a number of NVM devices, such as a number of NVM dies) which can be flash memory, but any suitable memory technology can be used such as, for example, phase change memory ("PCM") and other forms of variable resistance memories. It should be appreciated that the module arrangement of FIG. 1 supports the use of "spare" modules, such as to ensure against loss of use of some portion of the total number of modules. If the total capacity of the SSD is targeted at one terabyte (1 TB), it can be seen that sixteen modules, each of which has a capacity of 64 gigabytes (64 GB) satisfies this target. Thus, the total of 20 modules can provide an excess of 5 modules which can be treated as spares. Including a number of NVM devices in a single module can reduce the number of individual memory devices directly connected to the controller during read and write operations by a factor of the number of NVM die in the memory module.

As will be seen, communication with a module is provided via a module interface. The module interface can be a point-to-point interface and an independent instance of the module interface can be provided for each module in the system. This can be practical because of a low module pin count. The low pin count can enable many module interface ports to be provided within conventional pad-ring constraints of SSD controller in ASIC form, and each port provides an interface to one module. The point-to-point interconnection of modules and SSD controller ports can enable dedicated allocation of the resources of a particular module interface to transactions between the SSD controller and that particular module. When the interconnection established by the module interface between the main controller and the respective module is dedicated, transactions between the main controller and the module do not have to share the resources of the interface with other modules; these transactions can therefore be executed at the full bandwidth of each module interface. Also, when the connection is dedicated to one module, arbitration and resource sharing, that would otherwise be necessary if the interface were connected to more than one module, can be avoided. This can, in turn, improve system performance by allowing for increased performance in terms of both numbers of transactions and amount of data transferred over the interface.

Still referring to FIG. 1, a controller 40 is interfaced with each one of modules 30 via a module interface 42 (several of which are indicated using reference numbers) for each module. The controller is, in turn, interfaced to host 20 via a suitable high-level host interface 44 which can be any of various interfaces for attaching a memory system to a computer, for instance. By way of example, host interface 44 may be a SATA (Serial ATA) interface for some systems 12. Other systems 12 may employ the use of a SAS (Serial Attached SCSI) interface or the interface may be back plane oriented such as, for example, using PCI Express. In this regard, a suitable form of host interface can be selected in view of a particular end use.

A cache 46 can be included, such as to provide a performance enhancement to the overall SSD system 10. A cache may be realized by attaching any suitable memory device such as a SDRAM, PCM, fast flash (for example, SBC), and the like. The SSD controller 40 can have a dedicated interface for communication with one or more cache devices. Depending on the nature of the cache technology selected for a particular SSD design, this interface may be dedicated to the cache. If the cache device 46 is a module, then the cache interface can be the same as or similar to a NVM module interface.

Controller 40, when compared with controllers for prior art SSDs, can be viewed as simplified. Because the modules in system 10 can be charged with detailed management functions yet to be described below, the SSD controller can be relieved of the burden of many functions that are typically performed by prior art controllers. Non-limiting examples of functions that are offloaded can at least include (1) wear leveling, (2) garbage collection, (3) logical to physical address translation, (4) physical page to logical block abstraction, (5) ECC functions, and (6) memory conditioning and signal processing. Because many of the functions can be reduced or removed which would require heavy CPU and other supporting activity in a prior art SSD controller, such as those listed above, the bandwidth of the SSD controller can be relatively more dedicated to transferring user data between the host and the connected modules.

Figure 2:
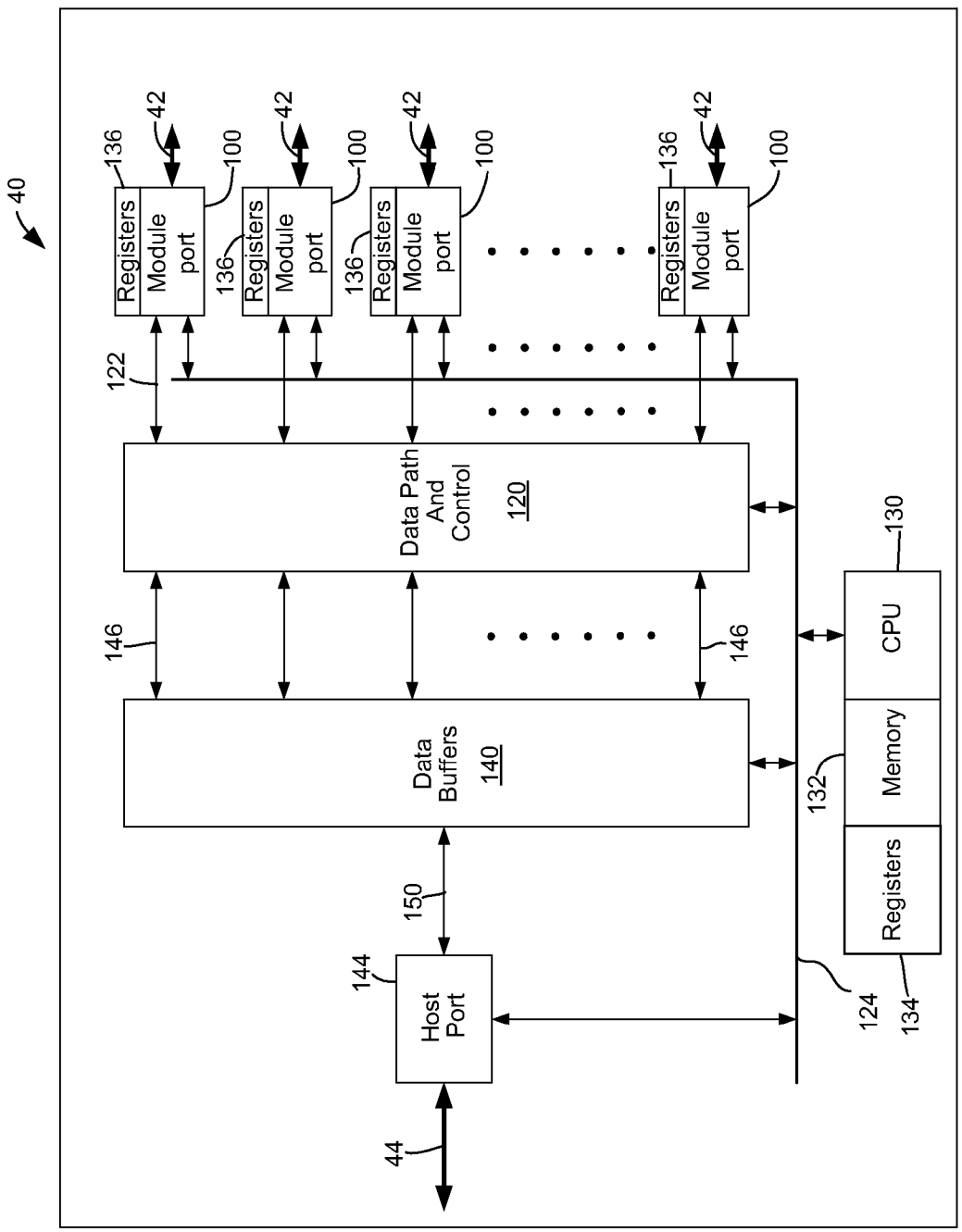
FIG. 2 is a block diagram which illustrates further details of a SSD according to an embodiment of the present disclosure.

Turning to FIG. 2 in conjunction with FIG. 1, the former is a block diagram which illustrates an embodiment of controller 40. The controller includes a plurality of controller module ports 100, each of which provides a module interface 42 to communicate with a plurality of storage modules 30 (FIG. 1). Each controller module port 100 provides one set of associated interface signal connections that are the same from one controller module port to the next. By way of non-limiting example, controller 40 can communicate with twenty modules 30 via twenty individual module interfaces 42, as shown in FIG. 1. The number of controller module ports in an SSD controller can vary. The particular number of controller module ports implemented in a given SSD controller can depend on design considerations involving the SSD controller itself, as well as on the SSD system. These design considerations can involve the desired storage capacity of the SSD, the desired performance, and the desired cost. The benefits of the controller module interface are provided regardless of the number of controller module ports implemented in the SSD controller of a particular embodiment.

Continuing with the description of main controller 40, a data path and control logic section 120 is configured to perform data transfers between each active controller module port 100 and the remainder of the SSD controller using bidirectional data paths, such as bus connections 122, several of which are indicated by reference numbers. A control bus 124 can provide a data path between a microprocessor 130, operating using code stored in a memory 132, and registers 134 contained in logic blocks making up the SSD controller. Each controller module port is connected to bus 124 to facilitate control by microprocessor 130. Accordingly, microprocessor 130 can read from and write to registers 136 in each module port and, in doing so, can manage (e.g., set up, start, stop, and monitor) the operations of each controller module port. A data buffer section 140 can provide memory for staging blocks of data that flow through the SSD controller either as read data destined to be transferred to a host through a host interface port 144 or as write data destined to be transferred to a module through one of controller module ports 100. A bidirectional data path 146 (several of which are indicated using reference numbers) can be provided between data path and control section 120 and data buffer section 140. It should be appreciated that a one-to-one correspondence between the number of bidirectional data paths 146 and the number of controller module ports 100 is not required. In this regard, a sufficient number of discrete bidirectional data paths 146 can be present in order to ensure sufficient total data bandwidth. That is the total number of bidirectional data paths 146 can be less than the total number of controller module ports, equal to the total number of module ports, or greater than the total number of controller module ports.

Memory 132 is accessible by microprocessor 130 in order to perform functions which manage the SSD controller, such as managing errors and exceptions as might occur during normal operation of the SSD controller, including those occurring because of errors in data received from one or more of the modules, because of exceptional conditions in the SSD controller (such as resource conflicts, buffer memory errors, and the like), and because of unanticipated problems occurring during the course of otherwise normal operations.

A high speed data path, such as bus 150, can be used to transfer data between buffering section 140 and host interface port 144. This bus may be of any suitable design that supports the SSD system requirements with respect to, for example: aggregate transfer rate through the host interface; latency between commands issued through the host interface and response to those commands; and concurrency to support simultaneous execution of multiple commands. Host interface port 144 is in communication with microprocessor 130 via control bus 124 such that the microprocessor can manage (e.g., control and/or monitor) the host interface 44. Although only a single host interface 44 is depicted in FIG. 2, more than one host interface may be present in a given SSD controller embodiment. For embodiments with multiple host interfaces, each instance of the host interface can be of the same type of interface (as would be the case with multiple SAS ports) or different instances may be of different types (such as, for example, some combination of SAS, SATA, and PCI Express).

A host to SSD controller interface 44 can be provided by host interface port 144. Such a port 144 includes signal connections and/or circuitry configured to perform all operations required by the host interface definition. If SAS or SATA interfaces are provided by host interface port 144, the physical connection can be made up of a minimum four signal connections organized as two differential pairs. In other embodiments, for example in the instance where SAS is used and where secondary interface signal connections are used, additional differential signal pairs can be present. For the case of SAS, more than one host port may be used: in such an embodiment, two sets of physical connectors can be present instead of one.

Figure 3:
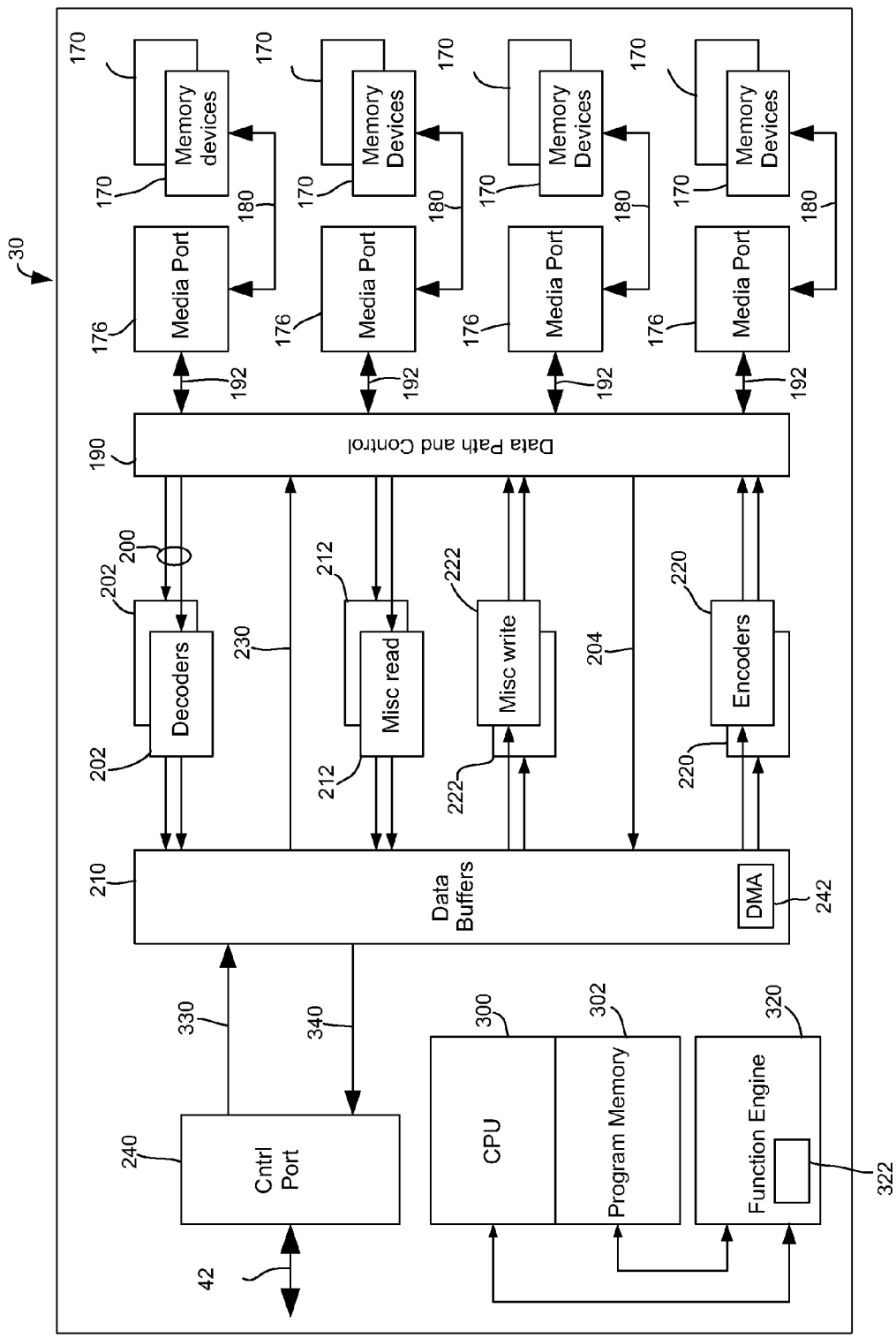
FIG. 3 is a block diagram illustrating an embodiment of a module that is used in a SSD, such as the SSD of FIGS. 1 and/or 2.

Attention is now directed to FIG. 3 which is a block diagram illustrating a module 30 (see also, FIG. 1) produced in accordance with an embodiment of the present disclosure. The module can include a plurality of memory devices 170. A total number of memory devices can vary from one to eight or more, and memory devices can be based on any appropriate technology. In some embodiments, the memory technology is NAND flash. The devices making up the overall memory of a module can be standard commercially available parts or devices that can be customized for use in a module. A number of memory devices 170 can be attached to a media port 176, such as to increase concurrent operation of attached memory devices and/or to increase data throughput in a SSD. As seen in FIG. 3, in some embodiments, each media port 176 can provide an interface to a group of memory devices.

Still referring to FIG. 3, each media port 176 provides a memory device interface 180 that can be used to communicate with a plurality of memory devices. Further, each module 30 can include multiple media ports 176. In some embodiments, the number of media ports is two or four. Each media port 176 can provide an industry standard interface such as, for example, ONFI (Open NAND Flash Interface) for communication with standard NAND flash devices, or each media port can provide a custom interface intended for communicating with customized memory devices. As noted above, one or more memory devices 170 can communicate over each memory device interface 180. In some embodiments, the number can range from one to four. Moreover, there is no requirement that the same number of memory devices be connected to each media port. Further, in some instances, a particular media port may not have any memory devices connected thereto. Such a situation can occur, for example, when a particular module arrangement does not use all available media ports.

A data path and control section 190 forms part of module 30 and can be configured to direct data traffic to and from media ports 176 in a manner that manages (e.g., coordinates) data traffic to and from the multiple media ports using various system resources in conjunction with the media ports themselves. Multiple data paths can be supported in the data flow between each media port 176 and the rest of the module. Decoder read data paths 200 include data paths to decoders 202; a direct data path 204 to a data buffer section 210; data paths to read logic 212; and data paths from one media port (in read mode) to another media port (in write mode) at least flowing through data path and control unit 190. Write data paths can include data paths from encoders 220; a direct data path 230 from data buffer section 210; and data paths from write logic 222. It is noted that most, if not all, data flows that can take place on these various data paths can be sustained concurrently with all other data flows. Some of the manners by which the subject concurrency may be maintained are described, as follows:

a. One media port 176 is used to perform a first write function to one of its attached memory devices 170. The data path used by the first write function is one of the available write data paths in the module. At the same time, another media port 176 is used to perform a second write function to one of its attached memory devices 170. The data path used in the second write function may be any of the remaining write data paths not already being used by the first write function. Because two media ports are performing concurrent write functions, the two memory devices receiving the write mode data are distinct. It is noted that this scenario is not possible wherein a single memory device is the target of simultaneous commands from two media ports because each memory device attaches to only one media port.

b. A first media port 176 is used to perform a write function to one of its attached memory devices 170. The data path used by the write function is one of the available write data paths in the module. At the same time, a second media port 176 is used to perform a read function from one of its attached memory devices. The read data path can be any read data path available to the second media port.

c. A single media port 176 can be used to simultaneously perform more than one command. This can occur as an active command on each of two or more memory devices attached to the same media port 176, or as multiple commands on a single memory device attached to same media port 176. In either situation, the concurrency of commands requires concurrent data flows over a single media interface 192 provided by a particular media port 176 and data path and control section 190 of the module. This concurrency of data flow is different from the cases described in (a) and (b) above in that there is a temporal constraint imposed by the fact that at any single instant in time, only one data value can be present on the particular media port interface 192. In order to sustain multiple data flows, the particular media port interface 192 can operate such that it is shared over time so that each active command is allowed to transfer data for a limited amount of time before it must yield to one of the other active commands. A commonly used term in the data communication arts that refers to this concept is "time domain multiplexing" which will be familiar to those having ordinary skill in the art.

d. Multiple media ports 176 can be used to cooperatively perform a single read or write command if a single unit of data (e.g., a block) is partitioned and written across more than one memory device. Data can be partitioned in various ways in the context of the present disclosure: one possible partition involves separating a block into two or more partitions by interleaving. Interleaving can be performed along bit or byte boundaries, or by using larger units such as, for example, words, double words, sectors, and the like. Interleaving may be performed either before or after encoding on a write operation. Whether the interleaving step occurs before or after encoding determines a corresponding order for a decoder. If interleaving is performed before encoding, a separate encode step is performed for each partition, which can mean that as many encoders as partitions are necessary to support the function. One advantage of an interleaving function for writing/reading single blocks across multiple memory devices is that it results in achieving much higher data throughput than would be possible with a non interleaved approach.

Module 30 includes one or more decoders 202. As a data path resource, in the present embodiment, each decoder 202 can support only one transfer (e.g., of a block of data or of a partition of data) at a time such that multiple simultaneous decoding of different transfers can take place when multiple decoders are provided in a module embodiment such as is illustrated by FIG. 3. The presence of multiple decoders provides the capability for true concurrent decoding of two different transfers.

The configuration of a decoder can vary according to the way the memory devices are being used, and so there are multiple variations that may be present in a module. As one example, if memory devices of a particular module are based on flash technology, different types of flash memory can be used. Further, within types of available flash, there may be one or more modes of use for each flash type. For example, if commercially available flash devices are selected, a memory device (or a portion of a memory device) may be used in a Single Bit per Cell (SBC) mode or a Multiple Bits per Cell (MBC) mode. In an embodiment, data can be written which is encoded with an algebraic error correcting code ("algebraic ECC") regardless of which mode is being used. Hence, an appropriate decoder for this case is one which decodes the particular code that has been applied and corrects errors up to the extent allowed by the particular code. As another case, a particular algebraic code used by a module for SBC or MBC memory can further depend on whether the SBC or MBC memory is accessed in units directly corresponding to the page structure of the memory device or if the module performs an abstraction service on behalf of the host that removes the page-level details from view (as well as management responsibility) of the host. Either case can involve a different decoder embodiment.

Another example resides in the use of memory devices that offer visibility, access, and control with respect to the internal functions of the memory device related to reading, writing, and erasing. A module that is made up of such memory devices can be written and read with greater precision than standard memories typical of the example described immediately above. The greater precision can provide not only greater density of information storage, but also can provide additional information that can be used to advantage in the decoding function. This additional information can exist in the form of additional bits of precision in the data written to and read from the flash memory and can be referred to as "soft bits" which is a term that will be familiar to those of ordinary skill in the data communications arts. Such a memory also allows for functions that compensate for read- or write-related distortions in data, and so offers the capability for configuration (e.g., adaption and/or correction) of read and write functions so as to provide one or both of higher data storage density (more bits per cell) and greater reliability (often manifested as increased program/erase cycles in flash memory). Such described capabilities can, in turn, require different configurations of the decoder(s).

In view of these examples, if one criterion for an embodiment of a module is to provide flexibility with respect to the use of different types of memory devices, the corresponding decoding arrangement in the module can provide a multimode function. Some of the particular variations that can be expected include:

a) BCH (Bose Chaudhuri Hoquenghem) decoding only, with one or more bit error capacity settings, b) RS (Reed Solomon) decoding only, with one more symbol error capacity settings, c) BCH decoding combined with a suitable form of sequential decoding (for example, convolutional), and d) RS decoding combined with a suitable form of sequential decoding.

A module that can be configured to provide more than one decoder function can operate particular instances of a decoder in particular modes. For example, a two-decoder module can support true decoding concurrency on two data paths. Part of the flexibility afforded by multiple decoders in a module accrues from the fact that at a given time, by way of non-limiting example, one decoder can be configured as a BCH-only decoder while the other decoder can be configured as a convolutional (Viterbi detector) decoder combined with a Reed-Solomon decoder.

With respect to encoders 220 of FIG. 3, the discussion immediately above can be at least generally extended to encoders and the encoding function, as the two functions are directly analogous. Accordingly, the discussion immediately above with respect to memory usage, decoder modes, flexibility, and concurrency applies equally to the encoding case.

Read logic 212 can be provided as operational support for at least semi-autonomous capabilities of a module as a storage subsystem. Functions performed by read logic 212 can include, by way of example, data processing used in conjunction with calibration or compensation such as, for example, the mean value and array processor functions described in commonly owned, copending U.S. patent application Ser. No. 12/888,585, filed on Sep. 23, 2010, entitled MEMORY QUALITY MONITOR BASED COMPENSATION METHOD AND APPARATUS (hereinafter, the '585 Application), for memory devices in which calibration and/or compensation functions afford specific control over their internal operations. In particular, compensation can involve signal processing using parameters associated with the physical arrangement of the memory devices, while calibration can involve a number of metric gathering analysis functions that can be performed as hardware functions under direct software control.

With respect to write logic 222, the discussion regarding read logic 212 and read functions discussed immediately above can also be at least generally extended to the write logic and write functions. In some cases, there may be a particular reason or advantage to perform an operation associated with compensation or adaptation in the write mode instead of the read mode. With regard to such adaptation, information such as, for example, signal-to-noise ratio ("SNR") related data, can be gathered as the basis for subsequent parameter values. In the instance of bit density configuration and by way of non-limiting example, a module can utilize the SNR statistics relative to a particular physical region of the memory that is reclaimed by a garbage collection function in configuring a bit density of that region when that region is reallocated. This can be the primary difference between the write and read functions. A module can include any suitable combination of read and write functions. Accordingly, in a given module, there can be configurable write functions but no configurable read functions; or there can be configurable read functions but no configurable write functions. In some embodiments, both configurable read and write functions can be provided.

Direct write data path 230 from data buffer section 210 to data path and control section 190 can provide low latency data communication when necessary, as well as an alternate data transfer path for transfers not requiring decode functions or read functions. The direct write path is a write path in that data transfer is to one of media ports 176 and an associated memory device 170.

Direct read data path 204 is analogous to direct write path 230 and extends from data path and control section 190 to data buffer section 210, such as to provide low latency data communication when necessary, as well as an alternate data transfer path for transfers not requiring encode functions or write functions. The direct read path is a read path in that data transfer is from one of media ports 176 and an associated memory device 170.

Data buffer section 210 is connected to a controller port 240 that provides one instance of a module interface 42 (see FIGS. 1 and 2). The data buffer section implements a data buffer function that provides data staging for transfers between the data buffers and the media ports as well as between the data buffers and the module interface. Such a data buffer function can provide, for example, speed matching between transfers into and from the buffers. For instance, any flash read command can involve transfer of memory device data to the module interface as a combination of (1) discrete transfers that originate in a memory device 170 and terminate at buffer 210 and (2) subsequent transfers that originate at buffer 210 and flow through module interface 42. Conversely, any function that writes to a memory device can involve a combination of (1) discrete transfers that enter through module interface 42 and terminate at data buffer 210, and (2) subsequent transfers that originate at data buffer 210 and terminate at a memory device 170.

It should be appreciated that data buffer section 210 can include a DMA portion 242 that is configured to control the flow of data into and out of the data buffers. In general, a DMA resource is made up of a starting offset, a count, and a sequencing function is assigned to each possible data path.

With continuing reference to FIG. 3, each module 30 includes an embedded microprocessor 300 that operates from a program memory 302, and which microprocessor is connected via a microprocessor bus, which is understood to be present but which is not shown for purposes of illustrative clarity, to various components which make up the module. In particular, the microprocessor can access registers in the various components. Software stored in program memory 302 can vary based on a particular embodiment. One having ordinary skill in the art will recognize that the extent of hardware support for given functions can vary. Hence, cooperation between software and hardware in performing management functions can be configured responsive to variations in:

a. memory device types.

b. encoding and decoding functions (e.g., algorithms).

c. compensation functions (applies to compensation on read data and to compensation before writing data).

d. block erase functions for flash memory.

e. module interface support (command execution) functions.

f. autonomous wear leveling functions, in which the module executes wear leveling as a self-contained function independent from the main controller).

g. semi-autonomous wear leveling functions, in which the main controller controls the wear leveling function by providing related parameters and commands to the module via the module interface.

h. local autonomous flash translation layer (FTL) implementation.

i. directed flash translation layer (controlled by host) implementation, in which the main controller controls flash translation operation by providing related parameters and commands to the module via the module interface.

j. physical memory access directed by the host. The host can access physical memory in the plurality of modules by issuing appropriate commands to the main controller, and the main controller can respond to such commands by issuing appropriate direct-access commands to one of the memory devices attached to a selected module.

k. physical memory access directed by the module, with logical block abstraction to the host.

l. autonomous garbage collection (usually applies to the local FTL).

m. semi-autonomous garbage collection in which the main controller exerts control over the garbage collection function in one or more of the modules attached to the main controller by writing appropriate parameters to the modules in which this control is to be applied.

n. support for directed garbage collection (such as internal block copy functions) in which the main controller controls the garbage collection function by writing appropriate parameters to at least some subset of the plurality of modules via each module's module interface.

o. local self test of attached memory devices p. autonomous power management functions It should be appreciated that the foregoing list is provided by way of example and is not intended to be all inclusive or limiting. Accordingly, the module configuration supports selection and reconfiguration of at least the above aspects of module operation in any suitable combination.

Still referring to FIG. 3, module 30 includes a function engine 320 that can be used to perform (e.g. represent) any suitable combination of functions provided through CPU 300 and program memory 302 as resources. Embodiments of function engine 320 can perform, for example, one or more of the various management functions described above. For example, wear leveling, FTL, and garbage collection, as well as other functions that may be desired and/or required, can be provided in an embodiment. Furthermore, the function engine can receive a set of parameters, provided from controller 40 and/or from the module itself which configures the functions. That is, the management functions of the module are configurable, at least to some extent, based on parameters that are provided from either the controller or the module itself. For example, the extent to which the controller directs a management function can be configured based on parameters that can be set by the controller. Once the parameters are established, however, the management function can operate autonomously in an embodiment. Parameter priority will be discussed in detail at an appropriate point hereinafter. In any case, however, the function engine is configured to perform a function(s) of interest, as will be further described. Main controller 40 can determine characteristics of operation with respect to a given function through a set of configuration parameters that the controller provides to a shared parameter section 322 of the function engine. The shared parameter section can be populated, for example, by CPU 300 responsive to controller 40 (FIG. 2) and responsive to module interface 42 of module 30 (FIG. 3). These configuration parameters determine how the function engine will perform (e.g., initialize and/or operate) each function such as, for example, wear leveling, garbage collection and bit density configuration. The configuration defined by the parameters for each function can define the requirements for activities to be carried out by both the module and the main controller. For example, at least semi-autonomous wear leveling can be carried out by the module with minimal related communication from the main controller following original configuration. Directed wear leveling, on the other hand, can require continuing or periodic configuration from the controller accompanied by monitoring of the wear-leveling activity by the controller via some form of reporting from the module. Such reporting can be accomplished by a module, for example, through updating output parameter values that are provided via a reporting section that is yet to be described. Accordingly, the function engine of each module can be configured to perform a management function for the nonvolatile memory devices of only that module based at least partially on one or more module input parameters. The main controller provides for digital data communication with the host device and provides for module digital data communication with each module of the plurality of modules such that any data flowing to and from one of the modules flows through the controller. Further, the controller can be configured to provide input parameters to each module to configure the at least semi-autonomous execution of each function of interest.

An input data path 330 from module interface 42 to data buffers 210 transfers data and control information from the module interface into the buffer section. This data path can be of a relatively higher speed, for example, relative to at least some other data paths extending between buffer section 210 and data path and control section 190 since incoming path 330 can serve a plurality of the data paths from data buffer section 210 to data path and control section 190.

An output data path 340 extends from data buffer section 210 to controller port 240 for transfer of data and control information from the buffer section to the module interface and forms part of an output data path from the module 30 to SSD controller 40 via the module interface 42 provided by controller port 240. Data path 340 can be capable of higher bandwidth than other data paths to or from buffer section 210 since, like data path 330, a plurality of other data paths can be served by output data path 340.

Figure 4:
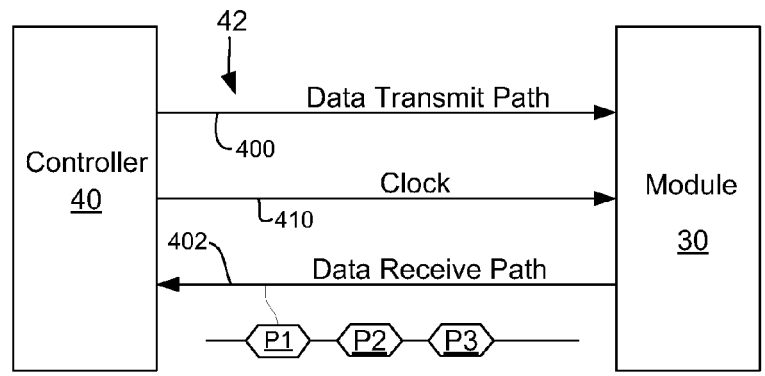
FIG. 4 is a block diagram which illustrates an embodiment of a module interface for use with a module, such as the module of FIG. 3.

Details with respect to an embodiment of module interface 42 are illustrated by the block diagram of FIG. 4 with the interface connection extending between module port 100 of controller 40 of FIG. 2 and controller port 240 of module 30, as shown in FIG. 3. The controller port and module port provide the command and data connection between each module 30 and controller 40 that makes up each module interface 42. A data transmit path 400 provides a communication path for transmission of commands, data, status, and other information from the controller to the module. Of course, these items can originate from host device 20 (FIG. 1). In an embodiment, the data transmit path can be established by differential signaling, so two physical signals can make up the data transmit path. The data transmit path can optionally be embodied in the form of a bi-directional signal pair such that operation in the reverse direction can act as a performance enhancement to the data transfer capability of the data receive path which is yet to be described.

A data receive path 402 provides a communication path for transmission of data, status, and other information from the module 30 to controller 40. Like data transmit path 400, path 402 can be established, in an embodiment, by differential signaling, so two physical signals make up the data receive path. In an embodiment, the data receive path can be implemented as a bi-directional signal pair and when operating in the reverse direction can act as a performance enhancement to the data transfer capacity of the data transmit path.

A differential pair of signals can provide a clock 410 over module interface 42. The clock signal that is directed onto the clock pair can be generated in the host and can also be used by the host for synchronizing data transmission and reception. The differential clock signal provided over the module interface can be used to synchronize data transmission and reception in the module. The clock received by the module is directly related to the clock generated by and used by the host. Because of transmission delay and other circuit effects, the clock signal received by the module may be out of phase relative to the signal used by the host, so sampling circuitry in both the host and the module can be assisted by clock alignment circuitry, such as a DLL or PLL, that can be dynamically configured (e.g., adapted) in order to achieve optimum alignment between clock and data signals.

Using the described interface, significantly fewer pins can be required by the SSD controller. While each memory module can support 8 flash chips, connection of the module to the SSD interface can be performed via one reduced pin-count module interface. In this way, the number of pins needed to control all the flash devices in the system can be reduced compared with prior art implementations wherein each memory device connects directly to the controller. The embodiments shown in FIGS. 1 and 4 can enable fewer pins by limiting the number of pins required for controller to module connections. That is, the reduced pin-count module interface of FIG. 4 provides connectivity to the controller with few pins when compared with prior art interfaces such as, for example, ONFI. In this way the SSD controller can connect to and control many modules with few pins on the controller (when compared with alternatives such as ONFI), while achieving transaction rates and data throughput rates appropriate for SSD applications. The module interface described herein provides for abstraction of low-level flash functions from higher-level SSD functions. Accordingly, the controller can be unburdened by being configured only with high-level aspects of command execution, for example. Low-level functions, such as those concerned with physical flash characteristics, can be carried on at the module level. It should be appreciated that SSD performance can be enhanced with increasing numbers of attached memory devices though the use of at least semi-autonomous functionality for managing memory devices. Within a single hardware configuration (a particular combination of pre-configured modules with a particular SSD controller) an SSD can be configured in which the modules are at least semi-autonomous entities wherein the role of the controller resides in accessing logically addressed data units in the modules. In such a system, the role of the controller with respect to management can be primarily to manage the storage provided by each module, as an aggregation of module units, into a single larger volume.

The module interface can include features and capabilities at the command and protocol levels which customize its intended application to SSD usage. These features and capabilities can include support for low latency read and write functions, support for high data throughput, support for command queuing and concurrently operating commands, support for out of order transfer of data blocks comprising a multi-block transfer operation, support for commands at different levels of block abstraction and a simple, yet advanced high-performance protocol, each of which will be described, in turn, immediately hereinafter.

Support for Low Latency Read and Write Functions

Low latency is supported in module 30 by supporting what can be the fastest possible response to commands received from controller 40. This can be accomplished by module interface 42 using embodiments taking at least two approaches: First, through support for concurrently executing commands, and second, through the option of short data packets. Through the first approach, a command can be issued to module 30 from controller 40 and acted upon immediately even though one or more other commands may already be executing. This allows the command to access a targeted memory device (if it is not already being accessed by a command to the same memory device) immediately, and enables data to begin transferring between controller 40 and a memory device 170 in the module more quickly than would be possible if a currently active command were to require completion before another command begins executing. Interface support for command queuing and for concurrent command execution can enable such concurrent execution capability. Through the second approach, the data transfer phase of read or write commands can begin more quickly and therefore complete more quickly as compared to the use of longer packets. The difference between the second approach and approaches using longer rather than shorter packets, is that shorter packets allow lower latencies because of the shorter transfer time of short packets relative to long packets; hence all concurrently executing transfers are allocated buffer bandwidth on a low-latency basis. A given command can be presented with a shorter wait time for access to the interface with short data packets as compared with having to wait potentially longer if longer data packets are used. Data packet length can be configurable. However, data packet length for a particular embodiment can be dictated, for example, by a parameter used at section allocation time that prioritizes for access latency according to packet length. Hence, a maximum packet length may be determined by controller 40 for a given module configuration. Also by way of the second approach, the direction switching function discussed with respect to data transmit path 400 and data receive path 402 of FIG. 4 can be employed. When selected, the direction switching function can enable faster transmission of all packet sizes, thereby increasing both throughput and latency performance.

Support of High Data Throughput

High throughput and low latency are sometimes conflicting purposes if larger packets are required for high throughput. While short packet sizes enhance latency performance, they also tend to degrade throughput performance because the inherent overhead of the interface is proportionally larger for small data packets than for larger packets. That is, short packets achieve lower transfer efficiency than long packets, hence when the demand placed on the interface approaches the bandwidth capacity of the interface, better data throughput is achieved for long packets than for short packets. As a configuration option, the ability to select packet size is also an aspect of the support for high data throughput in order to address the competing interests of high throughput and low latency.

Support of Command Queuing and Concurrently Operating Commands

A command queuing function can be present in module interface 42, in an embodiment, as primarily a hardware function. Each command that executes must have support for all transactions that will be involved in the execution of the command, including command transfer, data transfers, and status of handshaking transactions. These transactions, in turn, can use facilities such as DMA resources in proceeding. Such hardware resources can be provided in the module interface definition to the extent required to enable the command queuing function. An additional function for command queuing can be generation and checking of a queue tag. The queue tag is a short binary value that denotes an integer used to address the aforementioned hardware resources required for a command. A queue tag is transmitted with each new command code sent from the host to a device, and remains active as long as the command continues to execute. After a command terminates, the queue tag is no longer active and so becomes available for re-assignment when a subsequent command is issued.

Support for Out of Order Transfer of Data Blocks Comprising a Multi-Block Transfer Operation The module interface protocol can support a transaction model between the controller and module that enables out of order transmission of blocks to occur within a long multi-block transfer. The transaction model can provide that any read or write command be comprised of one or more "connections". Each connection is a virtual construct that allocates addressing and counting control for a portion of a longer transfer. As such, a connection exists as a temporal entity that exists to sustain some portion of a command (normally data transfer) and that must terminate due to a time constraint on its existence. The time constraint exists in order to guarantee that the interface is available to other commands that may also be active. The constraint may be fixed or variable. A read or write transfer may only require a single connection or it may require many connections. The number of connections required for a command, then is a function of the total length in bytes of the read or write command, and of the size of the time constraint. This determination of the number of connections can be made by command handling software running in the module. Connections may be established one at a time such that only one connection exists within a given command at a given time, or a given command may have multiple active connections, with each connection transferring a different portion of the overall transfer length of the command. Out of order transfer (of blocks) can be supported, for example, by establishing connections that transfer a block or a few blocks that may be out of order relative to their offset within the entire range of blocks being transferred by the command.

Each connection can be established as part of the execution of an overall command. A connection exists only long enough to transfer its allotted length of data which can be a block (as defined relative to a command) or as number of bytes defined by a count field in a command code. A connection terminates after the defined length of data is transferred.

Support for Commands at Different Levels of Block Abstraction

Controller 40 can utilize different approaches for accessing the memory devices attached to a module 30. While there can be variations, two embodiments are prevalent, as will be described immediately hereinafter.

In the first embodiment, the controller accesses memory devices attached to a module over a module interface 42 as standard media in which the memory devices include memory arranged as a hierarchy with pages at the lowest level of the hierarchy, and erase blocks at a higher level of the hierarchy. A read or write access targets a particular page with a page having a fixed amount of data and can include additional bits that are normally used for ECC parity. Another type of access is an erasure, which targets an erase block. An erase block, in flash memory, is a much larger structure than a page. In fact, an erasure block contains some integer number of pages, the number of which can vary. A typical value is 128 pages per erase block. Pages generally must be written as units, and erasures generally must be performed on entire erase blocks. Pages can be read from a memory device entirely or in part, but partial page reads can affect ECC encoding and decoding functions. Some ECC encoding functions may encode entire pages and thus require that an entire page be read in order for ECC decoding to be performed. Other ECC encoding functions may be implemented so that the encoding and decoding is performed on subdivisions of the data in a page: in this case, a partial page read can read one or more of these subdivisions in order for ECC decoding to be performed. Regardless of whether a full-page or partial page read, or a full-page write is to be performed, addressing of physical pages is performed using physical addresses. The use of physical addresses requires knowledge in the issuer of the command (controller 40, in this instance) of the physical arrangement of pages in each memory device attached to the targeted module.

The first embodiment is supported by encoding, decoding, and data path hardware in the module. Addressing, read, write, as well as ECC encoding and decoding can all be supported in the module as a selectable configuration in a manner that has not been seen heretofore.

The second embodiment is one in which the memory devices are addressed and accessed as logical units comprised of logical sectors or logical blocks with logical (rather than physical) addresses. Data lengths are not constrained by the physical length of pages in this approach, so the module can manage physical pages and erase blocks such that the logical structure is mapped onto the physical structure whereby the controller need only add a logical address to a command in order transfer the desired data. Functions in the module that support this logical form of access (sometimes called block abstraction) include various aspects of the encoder and decoder configurations, as discussed with respect to FIG. 3). Other aspects of this support, also discussed with regard to FIG. 3, include data path arrangements, and the miscellaneous read and write functions as related to compensation and calibration. Software features and functions are an integral part of this support, as the software provides support for functions that are involved with or related to the block abstraction capability. A few of these functions are the local Flash Translation Layer (FTL), control over erasure operations (e.g., garbage collection), wear leveling, bit density configuration (e.g., encoder/decoder configuration), and the like. Still further details with respect to block abstraction will be presented with regard to FIG. 5, yet to be described.

Simple, yet High-Performance Protocol

By implementing only the most essential functions, the module interface is able to operate with lower command overhead than would otherwise be possible. Because the interface takes the form of a point-to-point connection only, the protocol is relieved of the burden of multi-device support. No device addresses have to be generated, recorded, or used in order for a host to initiate, execute, and monitor transactions with a device. Similarly, the point to point physical connections implemented by the module interface are dedicated rather than dynamically established (as distinct from the finite-time logical/virtual connections discussed above as part of command execution). The configuration of each host/device connection via its own module interface is established at manufacturing time, so the host has no need to configure its devices at power-on time.

In addition, the interface supports both true concurrency (simultaneous independent transfers) and time domain multiplexed concurrency. True concurrency takes place when one or more read commands and one or more write commands execute concurrently. The interface concurrency occurs when data transfer phases for both read and write commands occur together, such that data receive path 402 of the module interface (FIG. 7) is actively transferring data from module 30 to controller 40 at the same time that data transmit path 400 is actively transferring data from controller 40 to module 30. It is noted that this type of concurrency occurs only for a configuration or for command in which the direction switching function discussed above is not engaged.

The time division multiplexed form of concurrency can frequently be achieved by the module interface. This occurs, for example, when one or more active commands have established connections that execute data phase transactions using data packets over the module interface. Even though multiple active connections may be established, at most one packet may be transmitted at any instant along a single data transmit or data receive signal pair. Time domain concurrency occurs because the active connections transfer data packets in an alternating fashion, with one connection transferring a data packet at one instant and another connection transferring a data packet at another instant. In this way, multiple commands can be transferring data packets concurrently, but doing so by sharing access to the physical transfer connection. For example, as seen in FIG. 4, packets labeled P1, P2 and P3 are transferred in a serial manner across data receive path 402 with each packet forming a different portion of an overall data transfer. Like transfers can also be supported across data transmit path 400. In an embodiment, such packet transfers can be concurrent on the data transmit path and the data receive path.

The SSD can be configured such that the controller provides different amounts of management oversight for different modules. Such an embodiment can be referred to as a mixed mode approach to the modules wherein one portion of the modules can be managed with at least some interaction with the controller in terms of performing functions such as, for example, wear leveling, garbage collection and bit density configuration, and another portion of the modules can operate autonomously with respect to detailed management of these functions.

With respect to bit density configuration, each module can include memory devices capable of high density operation (e.g., greater than 2 bits per cell) and, in an embodiment, can be configured by the controller to either operate in a high density mode or to operate in a low density mode (e.g., 2 bits per cell or less) across all the memory devices included in the module. In some embodiments, a module can be configured by the controller to operate some memory devices in high density mode (e.g., greater than 2 bits per cell) and to operate other memory devices in low density mode (e.g., 2 bits per cell or less). Where a module includes memory devices capable of low density operation (e.g., 1 or 2 bits per cell), that module can be configured by the controller to operate with an encoding and decoding configuration consistent with the low density operation. Configuration parameters for this selection can include the data length applied to each ECC encoding and decoding unit, and the number of parity bits included with each ECC encoding and decoding unit. Furthermore, if the low density memory is configured as either one bit or two bit per cell, the module can be configured by the controller to use a selected low density mode.

As discussed above, an at least semi-autonomous memory module can perform various functions in a stand-alone manner. Further considering the function of wear leveling, it should be appreciated that each memory module can be responsible for performing wear leveling within its own set of memory chips based on parameters provided to the module. Distributed wear leveling control removes most of the burden of having a controller monitor and adjust wear on each individual memory chip.

Other functions, by way of non-limiting example, can be handled at least semi-autonomously by a module according to the present disclosure. For example, each memory module can manage its own power consumption. When a memory module is inactive or lightly loaded, power management circuits on the memory module can be activated to reduce power consumption on a per module basis. This results in distributed power management without the overhead of a controller having to monitor and control the power state of each memory module.

As another example, each memory module can be responsible for monitoring and refreshing data within its own set of memory chips. This removes the burden of having the controller monitor the data quality in each memory chip.

As still another example, each memory module can handle all the error correction required for its own NVM chips. Such distributed error correction processing results in a much higher throughput than could be achieved if a controller is made responsible for all the error correction, as in a conventional SSD. Because the error correction processing can be distributed within the SSD, the amount of error correction that can be applied can be much higher than in a conventional SSD, resulting in a higher data density within the individual memory chips of some embodiments.

Due to the distributed processing power of the memory modules that have been brought to light herein, the throughput of an SSD that includes such modules can be increased many times over the throughput achieved by conventional SSD architectures. The SSD controller is not burdened (or at least has its burdens reduced) with functions such as, for example, error correction, data refresh and low-level wear leveling. Each memory module can handle a high data rate due to being able to control up to, for example, at least 8 NVM die per memory module. The high data rate can be multiplied by the fact that there can be multiple memory modules on each bus from the controller. This can again be multiplied by the fact that there can be several busses running in parallel between the controller and the memory modules. The overall result is an SSD that can achieve many times the data rate (throughput) of existing SSDs or hard drives.

The module interface can enable higher performance than would otherwise be possible using prior art techniques at least for the reason that the module to controller interface can be relieved of the need to carry large amounts of data that relate to low level functions that are now at least semi-autonomously performed by each module in a distributed manner instead of being the responsibility of the controller. Thus, the controller is free to operate without the burden of these low level functions, which in turn provides for simpler, more efficient execution of high-level SSD functions by the SSD controller. The result of this separation of processing duties is a more efficient, high-performance SSD system.

Figure 5:
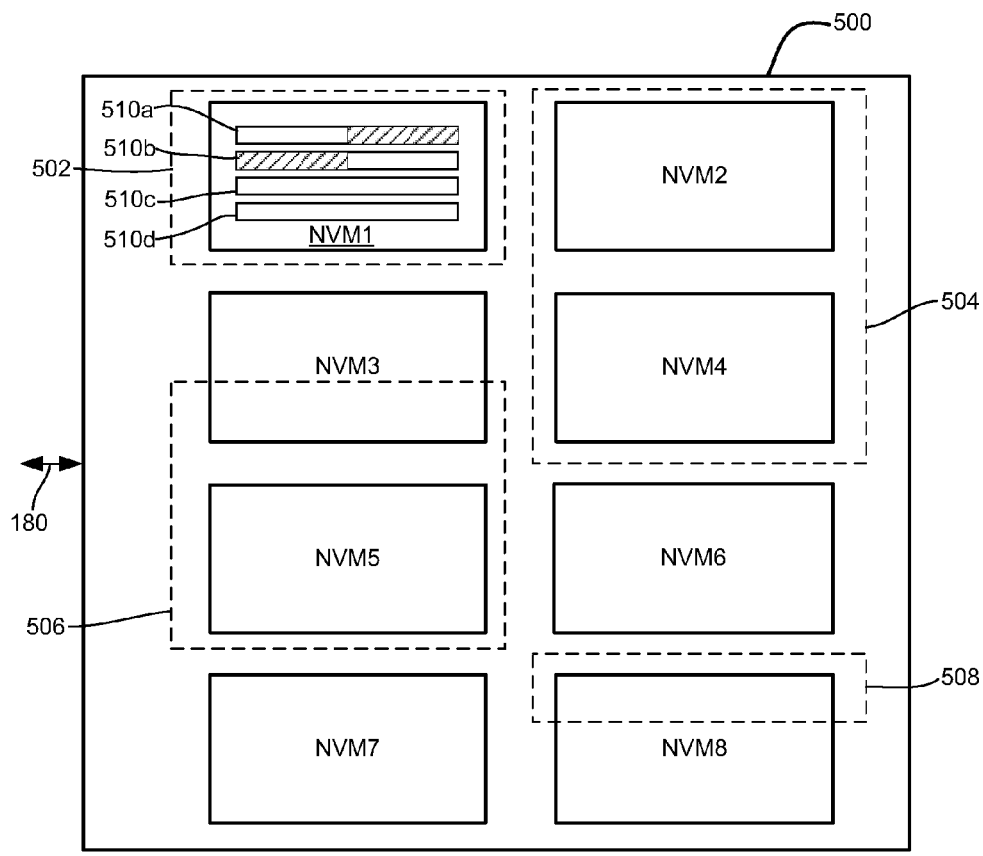
FIG. 5 is a block diagram which diagrammatically illustrates the memory devices of a module in conjunction with an example arrangement of memory sections across those memory devices.

Referring to FIG. 5 in conjunction with FIG. 3, the former is a block diagram which diagrammatically illustrates the multiple memory devices of one memory module 30 of FIG. 3, by way of example, with the module NVM memory collectively referred to by the reference number 500. In the present example, module NVM memory includes 8 memory devices that are designated as NVM 1-NVM 8. It should be appreciated that the use of 8 memory devices is by way of example and not intended as limiting and that other modules can include different numbers of memory devices that are organized in different ways while remaining within the scope of the teachings herein. Accordingly, module NVM memory 500 can be organized by controller 40 (FIG. 2) to be made up of some number of sections. The controller can partition the multiple memory devices into sections by any of various criteria, as will be described below. Sections can be allocated among the 8 memory devices in a highly flexible manner. Initially, it should be appreciated that the section allocations of the memory of one module to the next can be completely different and independent in terms of both physical region and bit density even though both modules include the same characteristic type of NVM. As a first example, a first memory section 502 includes only memory device NVM1. As a second example, a second memory section 504 includes memory devices NVM2 and NVM4. As a third example, a third memory section 506 includes a portion of memory device NVM3 and the entirety of memory device NVM5. As a forth example, a forth memory section 508 includes a portion of memory device NVM8. For purposes of these examples, it can be assumed that the portions of the memory devices that are shown outside of sections are unallocated. Thus, any one section can include a portion of an individual memory device and/or the entirety of one or more memory devices in any desired combination. In embodiments using NAND flash memory devices, a lower bound on the size of a section can be the extent of data that can be stored in a single erase block. Accordingly, the memory devices making up a module can be partitioned for purposes of optimizing the storage space that is available in a given set of memory devices based on parameters such as, for example, storage capacity, storage retention, program/erase cycles, data throughput, or some combination thereof. Partitioning of memory devices can be a dynamic capability that allows for allocation, de-allocation, and reallocation of particular physical portions of the memory as required to manage the memory devices over their useful lifetimes. The use of sections can enable, for example, optimal use of the memory devices based on the physical characteristics or type of memory according to the innate characteristics of that physical extent as well as its wear history.

Turning to FIG. 5, it should be appreciated that block abstraction generally involves the writing and reading of more than one page in a way that bridges across page boundaries and may be referred to as page wrapping. In this regard and by way of non-limiting example, NVM1 is illustrated as containing physically adjacent pages 510*a*-510*d*. If a read or write operation includes the hatched second half of page 510*a* as well as the first hatched half of page 510*b*, the read or write operation will involve reading or writing the entirety of pages 510*a* and 510*b*. The hatched areas of these pages, for example, can represent a codeword that is used by encoders 220 and decoders 202 of FIG. 3. Thus, page wrapping provides encode and decode functions extending across page boundaries as if there is no physical discontinuity between the pages for the purpose of the operation.

Figure 6:
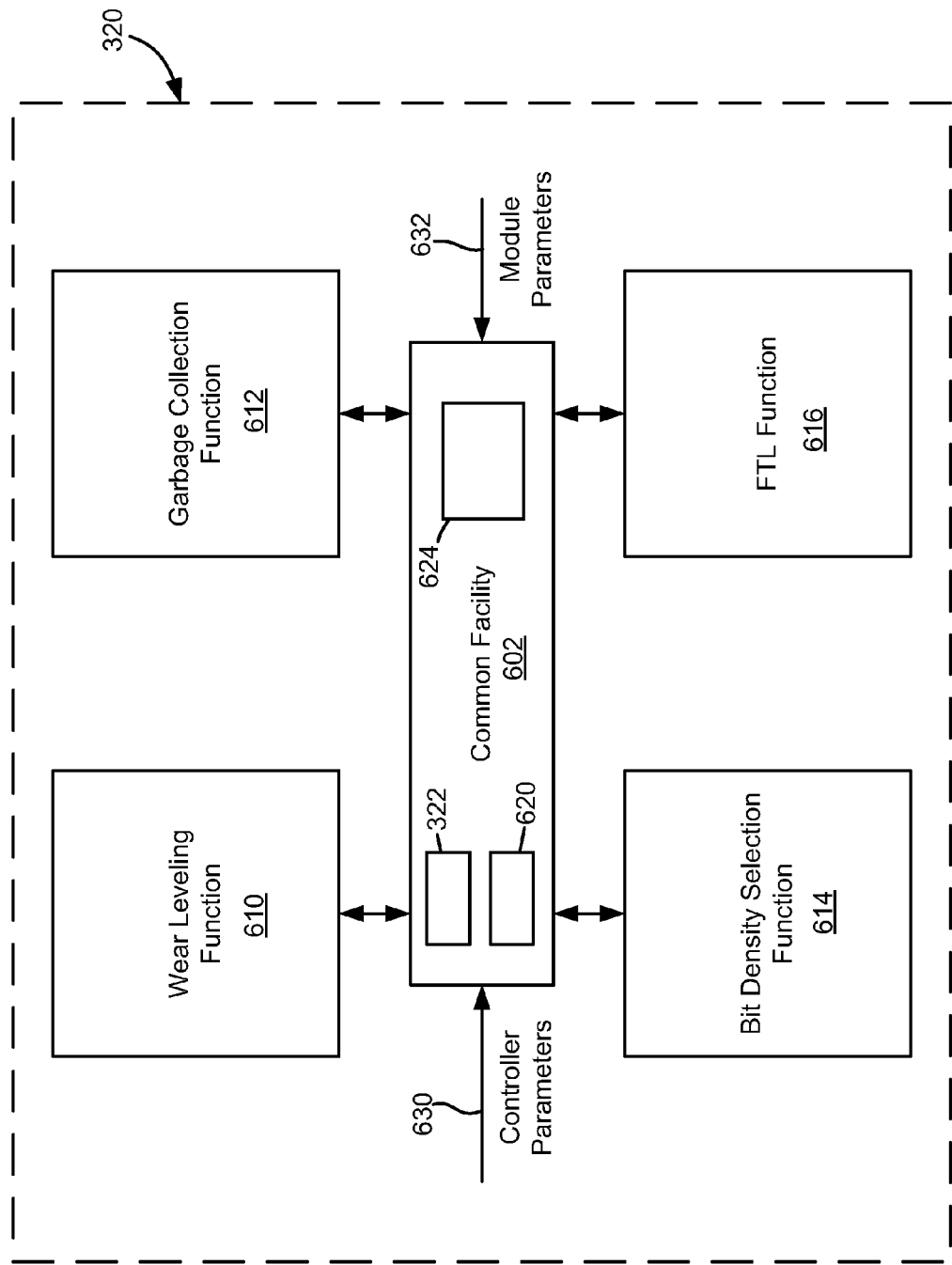
FIG. 6 is a block diagram of an embodiment of a function engine that can be used in a module, such as the module of FIG. 3.

Attention is now directed to FIG. 6, which is a block diagram illustrating an embodiment of function engine 320 of module 30, as shown in FIG. 3. The components of the function engine as well as their interconnections are shown. It should be appreciated that any suitable combination of hardware and software can be utilized for purposes of achieving the functions of the various components that have been illustrated. In an embodiment, CPU 300 and program memory 302 can subsume the operation of the function engine. A common facility (e.g., area) 602 of the function engine can make up a set of data structures that include parameters (e.g., data tables including parameters) that are used and modified in a common or shared manner by a wear leveling function 610, a garbage collection function 612, a bit density configuration function 614, and an FTL function 616, for example. Each of these functions is configured for executing its assigned task based at least partially on certain input parameters. It is noted that shared parameter section 322 (FIG. 3) is shown as forming part of common facility 602 and may, therefore, be referred to with reference to either FIG. 3 or FIG. 6. Other than the need for these input parameters, each function can operate autonomously with respect to other modules or the SDD system and controller, as a whole. Common facility 602 serves as an information conduit among the functions since, in some cases, the various functions share information and operate in a cooperative manner. In general, each function accesses up-to-date information from the data structures in the common facility in order to complete its tasks. For example, FTL function 616 uses an up-to-date logical to physical address translation that can be stored, for example, in a table area 620 in order to provide the function of returning physical locations of a data unit given the logical address of that data unit. Further, examples of the information that is maintained in the common facility will be provided at appropriate points hereinafter. In the present embodiment, the common facility further includes a reporting section 624 that is configured for reporting one or more output parameters (e.g., indicating use statistics) that relate to the nonvolatile memory of the module. The use statistics are available to the function engine itself as well as the main controller and can be based on a set of read values that are obtained during a read operation. The use statistics can include, by way of example, at least one of a mean read-back value for the set of read values that can be generated based on a read-back operation for a set of read-back values and a standard deviation for the set of read-back values. The use statistics can also include error correction statistics such as, for example, a cumulative error count and a per block error count in instances where the read operation decodes a block error correction code. It should be appreciated that the error correction statistics can be generated by one or more of decoders 202 (FIG. 3) from which the reporting section obtains the statistical information. Based on the use statistics, the function engine can set and/or select parameters in view of the health of the memory that is indicated by the use statistics. For example, if the use statistics indicate degradation of the memory based on a significant number of program/erase cycles, the bit density for the memory can be lowered. In an embodiment, the number of program/erase cycles can exceed a threshold program erase parameter that is specified for the particular nonvolatile memory that is in use.

In some embodiments, the reporting section of a module of the subset of modules can be configured to provide a health indication relating to the nonvolatile memory of that module based on the use statistics. For example, a parameter can specify a threshold at which the function engine responds by retiring a portion of the memory previously allocated at higher bit density by copying existing data away from that portion; erasing the portion; and then re-allocating the portion to a relatively lower bit density so that further writing to that portion would be at the lower bit-density. This activity can override at least some controller parameters, for example, those provided in an initial configuration based on ongoing wear of the memory. In an embodiment, the controller can access and monitor the health indication and provide parametric control to instruct the module to retire some portion of the memory as described above. Of course, these various activities invoke the use of the functions that are provided by the function engine and described in detail at appropriate points below.

In view of the foregoing, it should be appreciated that controller parameters 630 are provided by main controller 40 while module parameters 632 are originated internal to the module itself. Non-limiting examples of the latter include use statistics generated by a decoder 202 (FIG. 3). The controller parameters and module parameters are provided to common facility 602. The parameters are primarily used by the four illustrated functions themselves, and can influence the configuration of each function.

Still referring to FIG. 6, wear leveling function 610 is concerned with uniformly maximizing the number of use cycles across all memory devices in the module. One of ordinary skill in the art will be familiar with the underlying principles in the configuration of a wear leveling function and will appreciate the need for such a function resides in the fact that certain forms of nonvolatile memory exhibit a limited lifetime in withstanding a limited number of program/erase cycles. The wear leveling function is directed to extending the useful life of the memory devices of a particular module.

Garbage collection function 612 identifies memory units (sections, blocks, or pages) that have been written with no-longer-needed data and returns this memory to the pool of memory units available for subsequent writing with new data. Like the wear leveling function, one of ordinary skill in the art will be familiar with the underlying principles in the configuration of a garbage collection function.

Bit density configuration function 614 allocates memory units with bit density configurations determined as the result of choices made on criteria, yet to be described, for preferred bit density configurations in each applicable physical portion of the memory. In an embodiment, the memory units can be sections that are made up of blocks.

FTL function 616 provides a physical location of a particular data unit (section, block or page) based only on the logical address of that unit. Because wear leveling, garbage collection, and bit density configuration can all be dynamic functions that cause on-going updates affecting address translation tables, the FTL and other functions can cooperate with one another on a real-time basis to maintain up-to-date status in common facility 602.

Where like parameters form part of controller parameters 630 and module parameters 632, in an embodiment, priority is generally given to the controller parameters. In this regard, parameters may be organized in any suitable and flexible manner. For example, in some embodiments, the parameters can be organized in subsets wherein one subset of like parameters provides priority to values from controller 40 and another subset of like parameters provides priority to values from module 30.

Figure 7:
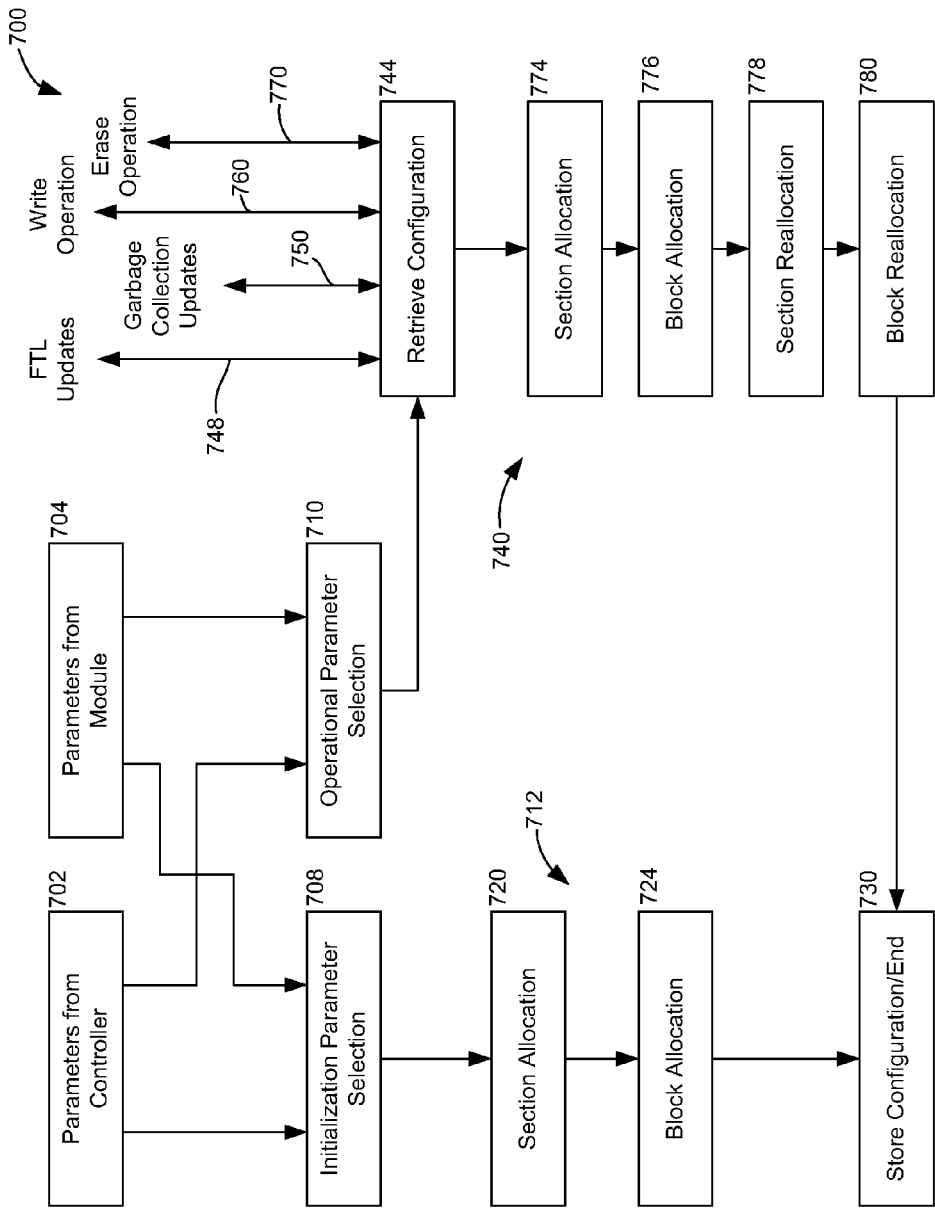
FIG. 7 is a flow diagram illustrating an embodiment of a wear leveling function that can be performed using the function engine of FIG. 6.

Turning now to FIG. 7, an embodiment of wear leveling function 610 of FIG. 6 is generally indicated by the reference number 700. The wear leveling function can operate on the basis of parameters available from main controller 40 at 702 and internal parameters available from the module at 704 as contained by shared parameter section 322 (FIGS. 3 and 6) of the function engine. Thus, a great deal of flexibility is provided with respect to performance of the wear leveling function insofar as the particular sources of the parameters. Irrespective of the source of the parameters, the wear leveling function is typically concerned with maximizing the operational life time of the memory devices of the module when these memory devices are comprised of storage cells that degrade after some number of program and erase operations.

Through the selection of parameters provided to shared parameter section 322, main controller 40 (FIG. 2) can assert greater or lesser control over the wear leveling function with regard to wear leveling functions. As discussed above, parameters established by the main controller can take precedence over parameters provided by the module. The parameters provided from the controller and module can be characterized in terms of initialization parameters which are selected at 708 and operational parameters which are selected at 710 and are applicable to on-going wear leveling following initial operation. Examples of initialization parameters can include addresses that define initial extents of the memory capacity of the module in terms of total blocks, and in terms of what subset of the total number of blocks are to be initially made available for data storage. Initialization parameters can also include parameters such as section size, section allocation order, block allocation order, and the like, that serve as directives to the sequence by which steps 720, 724, and 730 allocate sections and blocks within the sections to the initial memory arrangement. It is noted that initialization parameter selection 708 comprises the beginning of an initialization branch 712 of the overall process. The initialization parameters are generally provided by the main controller and establish the configuration of the wear leveling function at the outset of its operation. Generally, initialization can be performed once in order to establish an original wear leveling configuration of the module. Operational parameters from the main controller can be applied to non-initialization aspects of the wear leveling function. In some embodiments, operational parameters provided by the module can define on-going wear leveling activity subsequent to initial operation on the basis of the initial parameters from the main controller. Examples of the kinds of parameters that can be included with respect to non-initialization aspects of the wear-leveling function include ordering directives for section and block allocation and reallocation. Other examples include numeric criteria on how long a block or section may contain static data before it must be reallocated, or other numeric criteria such as the number of accumulated write/erase cycles, error correction statistics, and the like, upon which wear-leveling reallocation decisions can be made.

At 720, initialization branch 712 continues, by performing a section allocation initialization to allocate an original set of sections among the memory devices of the module. A block allocation function 724 is then performed to allocate a block set within each section. Examples of section allocations are shown in FIG. 5 and described above in relation thereto.

Following 724, an initial configuration has been established, which is stored at 730, for example, in shared parameter section 322 of the function engine (FIGS. 3 and 6). Thus, the initial configuration concludes and is available for reference and updates during an operational branch 740 of the wear leveling function.

At 744, a retrieve configuration process is performed. Subsequent to initialization branch 712, an initial configuration can be retrieved as established by the configuration stored at 730. Thereafter and with ongoing operation, the configuration can be managed by operational branch 740. During ongoing operation, current FTL table information can be retrieved via an FTL update path 748, for example, from table area 620 (FIG. 6) of the function engine. FTL updates occur as a result of write and erase activity, to be described in further detail, where addition or deletion of physical addresses by the FTL function necessarily affect the wear leveling function. It should be appreciated that path 748 is bidirectional for purposes of updating the FTL function. The wear leveling function, likewise, can make changes visible to the FTL function, for example, by editing an FTL region of table area 620. As one example, prior to a write operation, the FTL obtains a preferred location for the write from the wear leveling function. This is due to the role of the wear leveling function in defining the physical location for each new write operation from within all available locations, as will be described in further detail. An update from garbage collection function 612 is available on a garbage collection update path 750. These updates can be in addition to normal FTL and garbage collection updates for exclusive use by the wear leveling function. Because the wear leveling function has visibility to the garbage collection function, for example, via table area 620, the wear leveling function is able to allocate physical addresses for new writes from memory that has been returned to available status by the garbage collection function. It should be appreciated that path 750 is bidirectional for purposes of updating the garbage collection function.

Each write operation at 760 can interface with retrieve configuration step 744 of the wear leveling function in order to establish the physical location for the write within the memory configuration. As will be further described, the wear leveling function normally communicates with both the write function (initiated by a write command from main controller 40 (FIG. 2) and the FTL function, hence paths 748 and 760 are bidirectional. When a new write data location is used by the write function, this new location must be added to the FTL as the physical location corresponding to the logical address for write data. If an existing logical data unit is being overwritten by the write command, then the wear leveling function must be aware that the logical overwrite corresponds (as is applicable to NAND flash) to not only a data write to a new physical address, but also to deallocation of the current physical location of the data for purposes of updating the configuration.

An erase operation, like a write operation, involves a physical operation that invokes changes which both the wear leveling and FTL functions must accommodate. Thus, at 770, each write operation can interface with retrieve configuration step 744 to establish the physical location for the erase within the memory configuration. It should be appreciated that path 770 is bidirectional for purposes of updating an erase function. A logical erase can involve deallocation of an existing physical data unit. A physical erase corresponds to actual erasure of a physical extent of memory that returns the subject memory to availability for new writing.

At 774, a section allocation step examines a current section configuration over the aggregate memory devices in the module based on the retrieved configuration and determines whether allocation of new sections is needed. Any section additions to the current section configuration are updated to the wear leveling configuration. The latter can be stored, for example, in table area 620 (FIG. 6) of the function engine.

At 776, within each section the block configuration is analyzed to determine if any currently unallocated blocks require allocation. Any additions result in additions to the appropriate parts of the wear leveling configuration. Also, changes can be referred to the FTL and garbage collection functions.

At 778, sections that have become full of obsolete blocks can be reallocated. In NAND flash, this would correspond to an erasure step followed by either addition of the newly erased memory to the set of available sections, or addition of the newly erased memory to vacant storage awaiting reassignment to a new section.

At 780, each block within a section can be assessed to determine if the block requires reallocation. Reallocation normally occurs as the result of a block being written with obsolete data (written but flagged as no longer valid), in which case the block can be erased, and the vacant block is then flagged as available for new writes. The resulting configuration is then stored at 730 and operation branch 740 ends pending the need for its re-execution.

Figure 8:
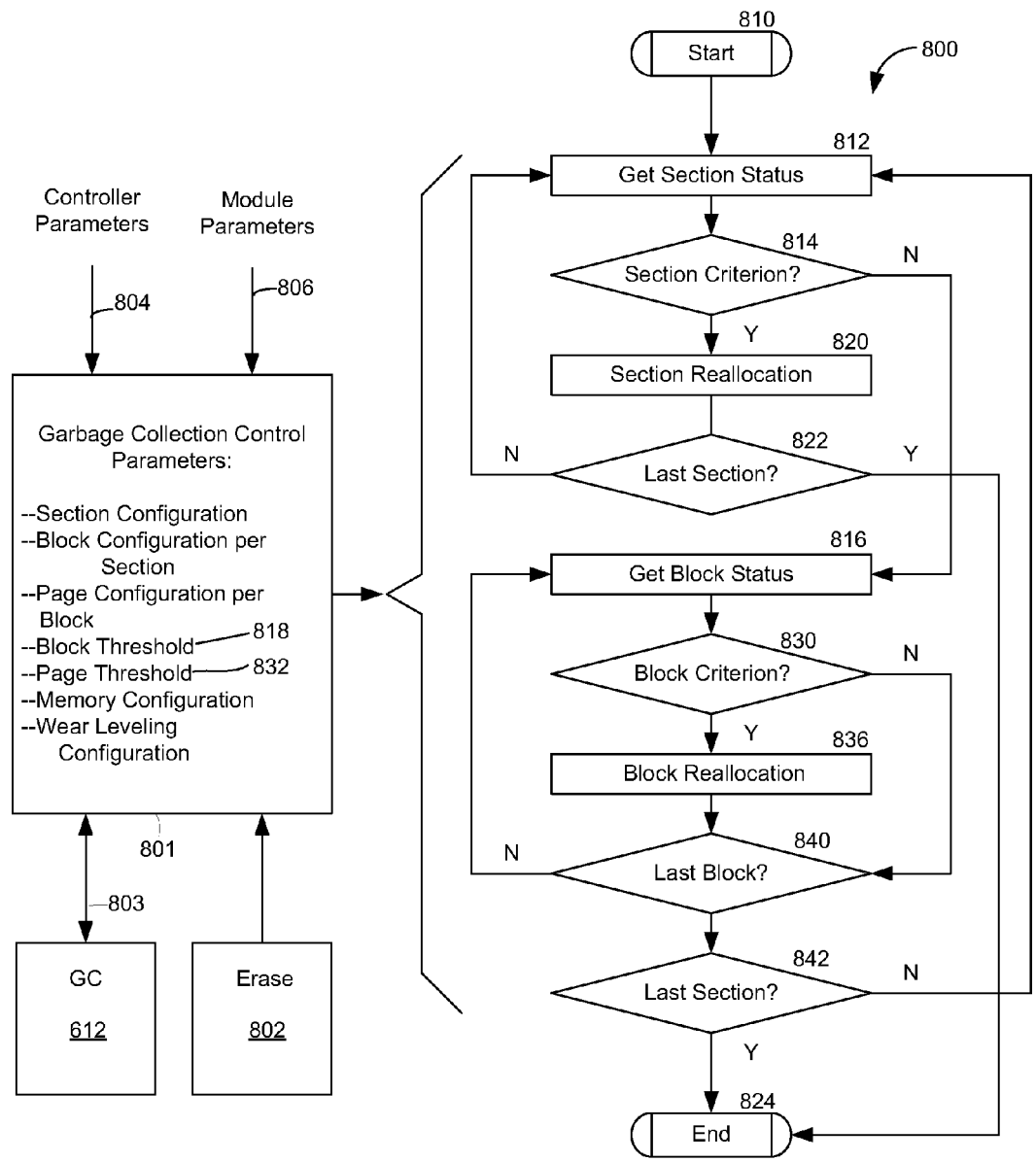
FIG. 8 is a flow diagram illustrating an embodiment of a garbage collection function that can be performed using the function engine of FIG. 6.

Referring to FIG. 8, an embodiment of garbage collection function 612 of FIG. 6 is generally indicated by the reference number 800. The garbage collection function can operate on the basis of a subset of parameters 801 available from main controller 40 at 804 and internal parameters available from the module at 806 as contained by shared parameter section 322 (FIG. 3) of the function engine. Irrespective of the source of the parameters, the garbage collection function is concerned with reclaiming previously written memory locations and making them accessible for subsequent writing in cooperation with the wear leveling function. As employed in this disclosure, memory is allocated for use as a hierarchy of units with pages at the lowest level. A limited number of pages are aggregated into a block. A page usually consists of a fixed number of physical storage cells though the amount of data stored in a page can vary according to the bit density configuration. Sections are made up of a number of blocks, and the number of blocks in a section may vary from section to section. Each module contains some number of sections (see FIG. 5) which may be allocated across the memory devices of a module in various ways.

It should be appreciated that the operation of non-volatile memory is generally subject to rules that have to do with physical makeup of the memory devices. For purposes of the present discussion and by way of non-limiting example, rules that are generally consistent with the behavior of NAND flash memory will be applied, although the present discussions are readily adaptable by one having ordinary skill in the art with respect to other non-volatile memory technologies. The generalized rules for reading and writing memory devices such as, for example, NAND devices, then are as follows:

a. A page is the minimum physical memory extent that may be written at one time. Writing to partial pages is not allowed.

b. It is desirable (though not always mandatory) to collect enough data to fill all pages in a block before beginning to write the block; then, to write all the data into the block as a unit. This accommodates compensation for page-to-page interference mechanisms.

c. A block is the minimum unit of memory that can be erased at one time.

The rules above imply block-centric mechanisms for read and write access. As such, garbage collection steps can be responsible for retrieving storage capacity by separating obsolete pages from active data pages through consolidation of pages into blocks containing either all active data pages or all obsolete data pages. Blocks that contain nothing but obsolete data pages can be erased, and returned to an available status. It is here noted that the term "obsolete" in the current context refers to a unit of memory (a page, a block or a section) whose cells have been written with values but which are no longer recognized as valid by the module. This is in contrast with the alternate case of written data which is recognized as valid by the module. This latter case is referred to as "active" data. A data unit which currently contains no written values other than the erasure state in its cells is defined as "available".

Still referring to FIG. 8, subset of parameters 801 obtained from main controller 40 and module 30, as well as other configuration parameters are applied to the wear leveling function. Other configuration parameters can include information regarding the memory configuration and the wear leveling configuration. Memory configuration includes the arrangement of sections, blocks and pages across allocated portions of the memory devices of the module, and the wear leveling configuration can include parameters involving the relationship between the garbage collection and wear leveling functions.

Garbage collection involves a set of operations that result in the identification of obsolete pages, consolidation of obsolete pages into obsolete blocks and block erasure. The function can also operate at the level of sections, in which obsolete data units are consolidated into sections which, in turn, are migrated into available sections by erasure of the constituent blocks of the section. It should be appreciated that the garbage collection function and the erase function communicate to exchange information on updates that affect blocks in the memory. Erase function 802 informs the garbage collection function of block erasure completions that allow the garbage collection function to remove such erase blocks from a list of blocks pending erasure. At 803, bi-directional communication is conducted between garbage collection function 612 and wear leveling function 800 via parameters 801. For example, the wear leveling function signals both write completions and erasure completions to the garbage collection function. These notifications cause the garbage collection function to update configuration information it maintains regarding blocks pending erasure, as well as blocks being written. The garbage collection function, in turn, notifies the wear leveling function of these changes, thereby allowing the wear leveling function to order lists of available physical addresses according to priority as next locations for writing.

The garbage collection function begins at start 810 and occurs on a section-by-section basis with the first step being retrieval of the status of the first section at 812. At 814, a section criterion is applied to measure the section condition as reflected by the section status. The section can: (a) be completely comprised of valid blocks; (b) be comprised of a mixture of obsolete and valid blocks; or (c) be completely comprised of obsolete blocks. If case (a) applies, there is no need for wear leveling activity in the current section, but within the section, there can be a need for garbage collection to be applied to the component blocks of that section which results in transfer of control to a block level process which begins with a get block status step 816. If case (b) applies at 814, the section criterion is affirmative and the number of obsolete blocks is compared with a block threshold parameter 818 that applies for the particular configuration of the current section. If the number of obsolete blocks is greater than the threshold, then a process is undertaken to reallocate the section at 820. In an embodiment, the reallocation can involve allocation of a new section of the same configuration as the current section and copying any still valid blocks from the current section to the new section; then designating all blocks in the current section as obsolete. The current section can then be erased by erasing each of its blocks. After these steps, the current section can return to the pool of unallocated memory. If case (c) applies at 814, the section criterion is affirmative and the number of obsolete blocks will exceed the threshold, since all of the blocks are obsolete. Reallocation at 820 can erase all of the blocks and return the current section to the pool of unallocated memory. Operation can then proceed to 822 which determines if another section is available. If not, the process ends at 824. If another section is available, operation returns to 812 with that section becoming the current section. The process repeats until all allocated sections have been handled.

For sections which enter the block level process at 816, as discussed above, the block level process operates within a section. In some instances, every section may require block level processing such that completion of the block level process across the entire module can perform block-level processing successively in each of the sections of the module.

A block criterion decision 830 invokes a page threshold parameter 832 of the number of obsolete pages within a block that calls for reallocation of the block. The block level process is analogous to the section level process in cases (a), (b), and (c), as described above with respect to the section criterion of 814 except that the obsolete units of concern are pages making up blocks instead of blocks making up sections. At 830, if more than threshold value 832 of pages are obsolete within the current block, corresponding to cases (b) and (c), then a new block is allocated at 836 within the current section. The new block receives still-active pages from the current block. It is noted that, in order to fill up the newly allocated block with active pages, this step may be executed concurrently over multiple current blocks so that the newly-allocated block can contain active pages from multiple current blocks. The current block (or combination of current blocks) from which active pages have been moved, can then be erased accompanied by returning erased blocks to available storage within the section. Thus, a new block or blocks are allocated within the current section to receive valid pages from blocks targeted for erasure. Such allocated blocks contain active data pages.

Upon completion of block reallocation, operation proceeds to 840 which checks for the last block. If another block is available, operation returns to 816 and assigns the next block as the current block for purposes of undergoing block level handling. If no other blocks are available, operation proceeds to 842 which tests for another section. If another section is available, operation returns to 812. If, on the other hand, another section is not available, operation ends at 824. Accordingly, the block level process executes for all blocks in a section undergoing block level processing, however, only blocks that contain some proportion of active data or obsolete pages are examined by the process. Blocks that contain neither active data pages nor obsolete data pages do not require examination by this process; they are however available for allocation by the process.

Completion of the last section at 824 corresponds to completion of one application of the wear leveling function. Some embodiments can require that the wear leveling function only be executed by explicit invocation by the module; other embodiments can utilize the wear-leveling function as a continuously running background task. In the case of completion of wear leveling, either at the block level or at the section level, updates 750 (FIG. 7) can be applied by the garbage collection function that will be visible to and affect wear leveling function 700 (FIG. 7) and the FTL function which is yet to be described in detail.

Figure 9:
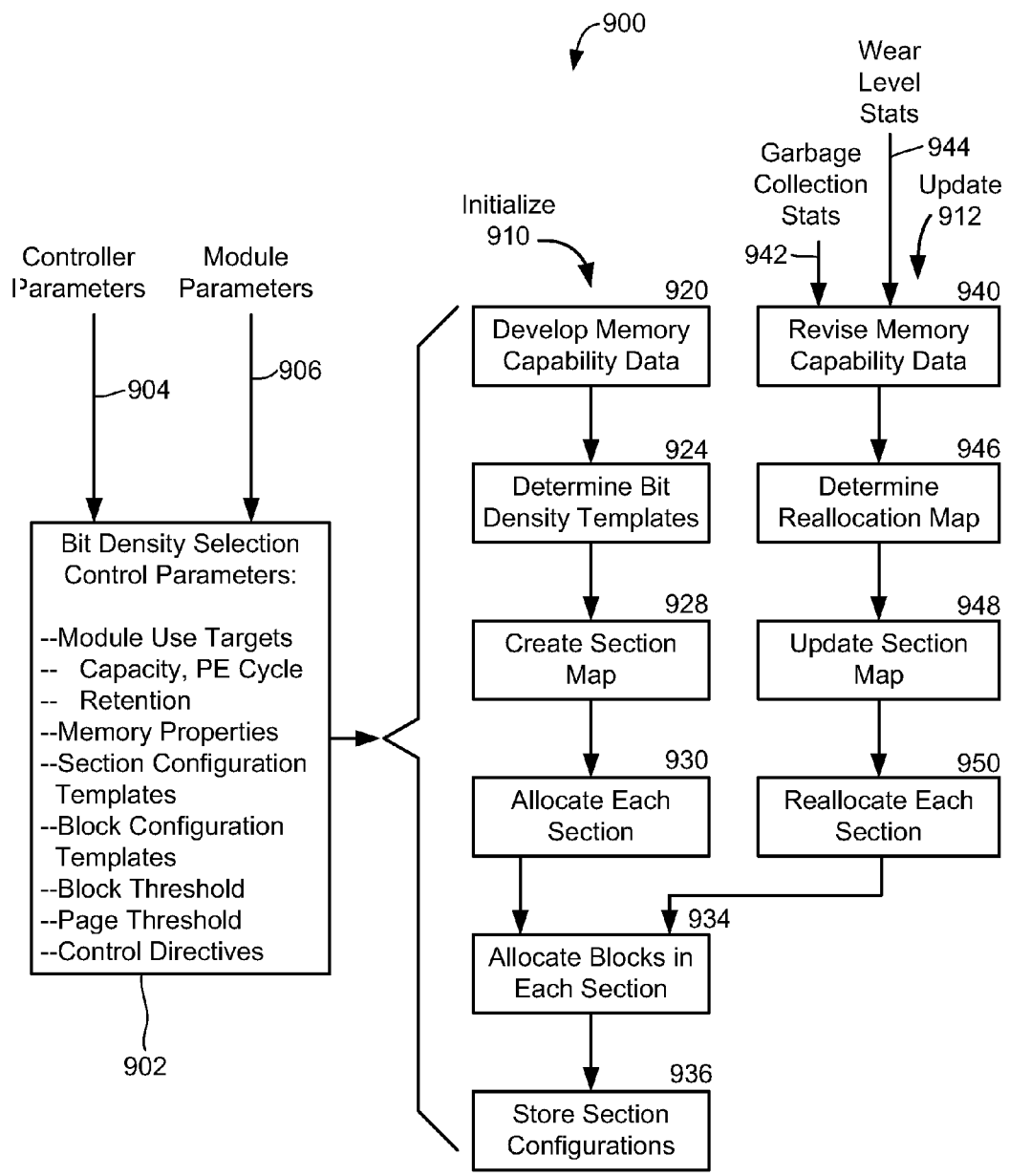
FIG. 9 is a flow diagram illustrating an embodiment of a bit density configuration function that can be performed using the function engine of FIG. 6.

Referring to FIG. 9, an embodiment of bit density configuration function 614 of FIG. 6 is generally indicated by the reference number 900 and shown as a flow diagram illustrating a function to configure the bit density of the nonvolatile memory of a module. The bit density configuration function can operate on the basis of a subset of parameters 902 available from main controller 40 at 904 and internal parameters available from the module at 906 as can also be contained by shared parameter section 322 (FIG. 3) of the function engine. In accordance with this embodiment, the function by which sections are allocated within a module for operation at a particular bit density is shown subsequent to initial allocation of the sections by the garbage collection function. It should be appreciated that many different bit densities can be available, and the available bit densities can be determined, at least in part, based on both memory technology of the memory devices of a module as well as the encoding/decoding function that is employed during read and write operations. Bit density configurations can vary from single bit per cell configurations to multiple-bit per cell configurations. Each bit density value in terms of bits stored per cell can also have variations that have to do with the encoding and decoding approach as well as the amount and type of additional overhead used by that encoding and decoding function. The encoding and decoding approach can involve a combination of codes as previously described that achieve results as a function of the amount of applied overhead. Convolutional codes and block codes can both operate at various levels of overhead, with the specific amount of overhead being determined by parameters applied to implementing such codes in a controller setting. The amount of overhead, in turn, is normally specified for optimum performance in the face of SNR and any other degradation mechanisms characteristic of the memory devices sections at hand. Bit density can be applied as an attribute which can apply at least down to the level of block units in NAND flash. Ultimately, the granularity of the bit density configuration can be a function of the selected encoding and decoding function as well as the memory technology in the memory devices of a module. In the example given in this disclosure, bit density configuration is set at the section level so that all blocks within a given section operate at the bit density selected for that section. It is noted that a section can be comprised by a single block; this would represent a respect to the use of NAND flash wherein individual bit density configurations are applied to data holding units as small as a single block.

Method 900 includes an initialization branch 910 and an update branch 912. Initialization branch 910 is executed whenever a new section is allocated (or reallocated, for example, due to garbage collection and memory reconfiguration). Update branch 912 can be executed periodically during the module lifetime for a bit density configuration that is applied to a region of physical memory underlying a section. Over the lifetime of a memory device, a particular extent of physical memory can belong to different sections at different times, although at any given time the particular extent can belong to no more than one section. For a section in active use, the bit density configuration function can monitor the condition of the physical memory making up the section. For example, the bit density configuration function monitoring some portion of physical memory operating at a particular bit density configuration can detect degradation of the physical memory such that subsequent reallocation of the same physical memory can require a bit density configuration more tolerant of a lower SNR (signal-to-noise ratio), as a result of the degradation.

Parameters from main controller 40 (FIG. 2) can take precedence over those supplied by the module. In some cases, the main controller can customize most or all of the bit density configuration function performed by the function engine based on the controller parameters. In other cases, the main controller can delegate management to the module such that the bit density configuration function is defined by the module parameters. In still other cases, the governing set of parameters can be a cooperative combination of controller and module parameters. In any case, however, the actual bit density configuration function is performed by the module irrespective of the particular source of the parameters, for example, autonomously once the parameters have been established. It should be appreciated that parameter values can determine aspects of bit density with regard to selection of a bit density configuration for each section and with regard to alternation from one bit density configuration to another, and even with regard to deallocation of a section from the active memory pool (as in the case of the component memory having become "worn out" due to exceeding a maximum number of program/erase cycles).

It is noted that the subset of parameters 902 is not intended as being comprehensive. Major parameter categories include targeted use modes, including capacity, density, and lifetime criteria (e.g., number of program/erase cycles). Other criteria manifested by the parameters are memory physical properties that are used by the bit density configuration function to perform allocation, reallocation and deallocation. Another parameter category defines possible configurations: this includes bit density configurations at the section level. A number of control directives may be used in conjunction with parameters defining thresholds that apply to error rates and other metrics for decisions on bit density configuration changes. These control directives can instruct the function engine to take (or not take) some action relative to a threshold criterion. As one example, when corrected error rates in pages start exceeding some defined threshold, an associated control directive can cause the garbage collection function to initiate a process on the affected section of the memory.

With continuing reference to FIG. 9, initialization branch 910 applies to processes executed at the initial start of module operation. Initialization generally occurs only once due to the fact that continued bit density configuration depends upon ongoing maintenance of parameters, such as those arising from various aging and wear mechanisms during the operational lifetime of the module memory. At 920, information is gathered in the form of memory capability data to enable decisions with respect to the capability of the particular memory in the module. Memory capability data can be organized with respect to localized portions of the memory devices in the module so that parameters (e.g., metrics) exist for each of these localized portions. The granularity of this localization can be implementation dependent and can even vary within a single module. The initial memory capability information can be gained as one result of self-testing or other function performed by the module or by the main controller for purposes of determining the capability of the memory with respect to bit density configurations. One useful parameter is a measure of the SNR (signal to noise ratio) of the memory which itself is an indicator of the number of bits the cells of the memory are capable of storing. As use history of the memory devices of a module accumulates, additional parameters (e.g., use statistics collected during updates to the bit density configuration functions) can enable subsequent decisions with respect to bit density configuration and reconfiguration for each physical extent of each memory device. Other use statistics are available, for example, from decoders 202 (FIG. 3). Quality metrics and related use statistics can be generated for purposes of initialization and operation, for example, as described in the above incorporated '585 Application. It should be appreciated that the general term applied in this disclosure to the parameters (e.g., set of measured information) relating to memory performance, as described above, is memory capability data.

After an initial set of memory capability data has been acquired by initialization branch 910, a set of bit density configuration parameters (e.g., templates) can be assembled, at 924, which represent a bit density configuration menu for the module. The menu selections can be taken directly from or derived from a predefined set of bit density configurations which represent an overall combination of parameters for use by the encoding and decoding functions. In the present embodiment, each menu selection is applicable to a section of the memory, however, in other embodiments, menu selections can apply at the block level or lower in the memory hierarchy. A wide range of parameters is possible among the menu selections, but each parameter can define at least the number of bits in a memory cell, encoding/decoding parameters and an amount of parity to be employed.

At 928, a section map is created by applying the bit density configuration parameters, from 924, in conjunction with other parameters from subset 902. The section map is a data structure, as diagrammatically seen in FIG. 5 that can list locations, extents, and configurations of each allocated section. The result is a set of sections mapped across the memory devices of the module (FIG. 5) in which each section can at least potentially be configured with a unique bit density configuration. The application of bit density configurations to the sections can encompass a wide range of variations extending from the case of every section using the same bit density configuration, for example, 4 bits per memory cell, to every section using a different bit density configuration.

At 930, after the section map has been created, the bit density configurations are applied as part of section allocation. This can include updates to FTL tables in shared parameter section 322 (FIG. 3) that define the location and extent of physical memory corresponding to a logical address. In addition, an association can be made between the bit density configuration (from one of the bit density configuration templates) and its corresponding section. This association enables subsequent reading, writing and erasure functions to identify not only the correct logical to physical mapping in order to access commands from the main controller, but also provides for correctly configuring read/write settings in the module.

Each section as defined by section allocation 930 is ultimately comprised of a set of blocks, the number of which must be defined. At 934, block allocation is performed for each section, for example, by updating table structures in table area 620 to accommodate the exact number of blocks that will comprise the section.

At 936, the section configuration for the module is stored. The section configuration can include appropriate parameters (e.g., tables and)templates to completely define the section structure of the module (at least as of the end of the initialization flow), and to enable operation of the memory cognizant of the various bit density configurations that may be involved, as well as to enable future updates as may be required by aging and wear effects arising from continued use.

Turning now to a description of update branch 912 of the bit density configuration function, the update branch can run at intervals over the lifetime of the module in some embodiments. As is the case with the initialization process, parameters that are applied can be provided by either or both of the main controller and the module itself. Again, parameters from main controller 40 (FIG. 2) can take precedence over those supplied by the module. The bit density configuration function can be defined by controller provided parameters, module provided parameters or any suitable combination thereof. In any case, however, the actual bit density configuration function is performed by the module, irrespective of the particular source of the parameters. Update branch 912 is usually performed whenever changes to bit density configurations are required for an existing section. Examples include the need to deallocate and/or allocate sections due to wear leveling and garbage collection actions, or due to bit density configuration revisions necessitated by aging of the memory.

At 940, the update branch begins by revising the memory capability data originally developed by initialization branch 910. Garbage collection and wear leveling functions provide inputs at 942 and 944, respectively, to step 940 since these functions affect the memory capability data. As discussed above, the memory capability data is comprised of parameters which are indicators of the ability of the memory to store and retain data at various bit densities. With inputs from garbage collection and wear leveling functions, the memory capability data is revised. In view of the revised memory capability data, at 946, a reallocation map is determined which reflects any changes in bit density configuration for current sections as compared to the current allocation for the current sections. This map establishes which sections are required in the new allocation (from garbage collection results) and where these sections can be placed (from wear leveling).

Using the reallocation map from step 946, step 948 produces an updated section map by specifying changes from the current allocation to the new allocation (where the current allocation was determined by either initialize branch 910 or a prior pass through update branch 912) which changes are added to the current version of the section map. At 950, the new sections are allocated to the memory as specified by the new/updated section map. The update can be accomplished, for example, by writing updates to data structures in table area 620 (FIG. 6). Block allocation then proceeds at 934, as described above.

Figure 10:
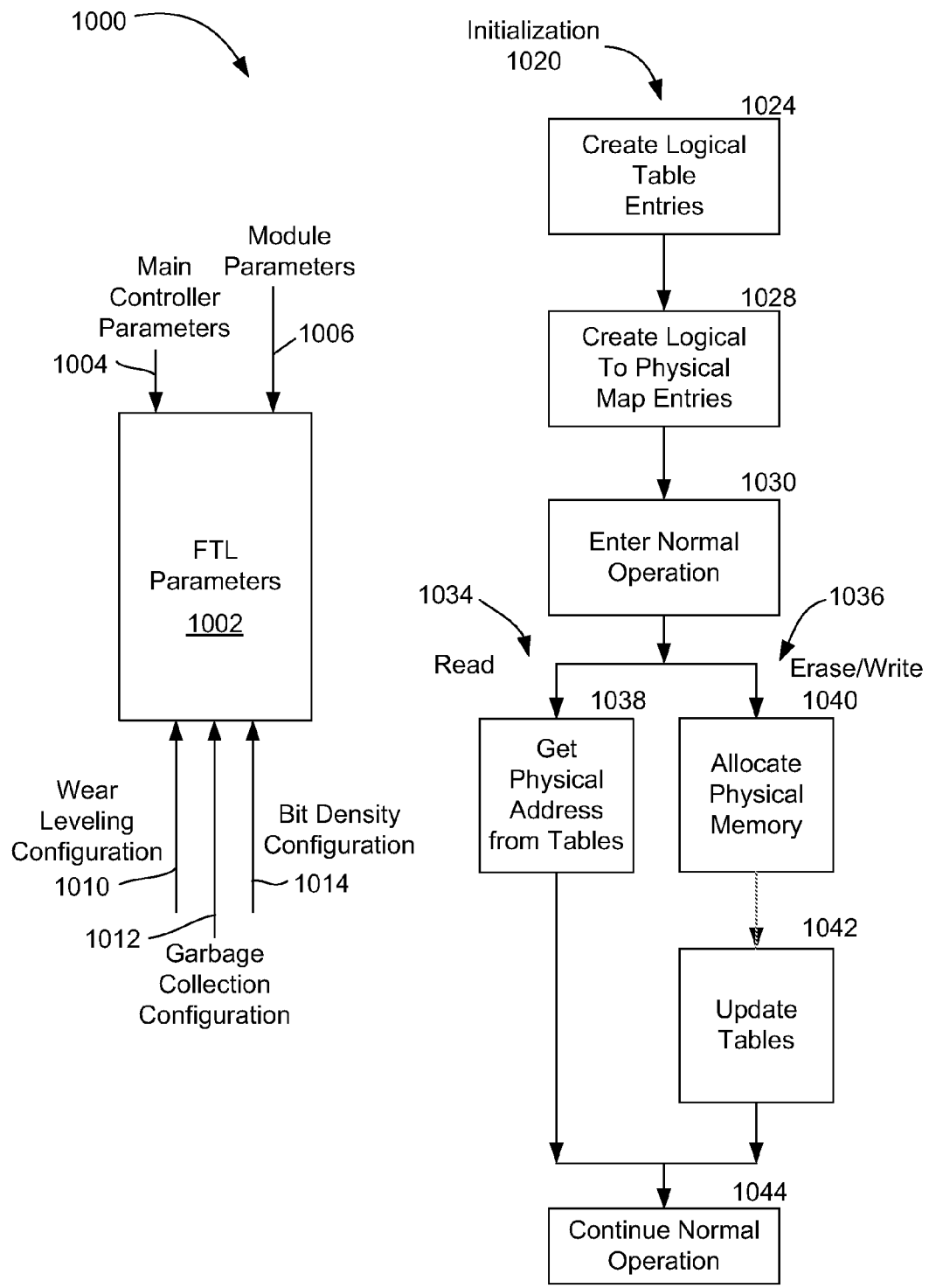
FIG. 10 is a flow diagram which illustrates an embodiment of an FTL (Flash Translation Layer) function that can be performed using the function engine of FIG. 6.

Referring to FIG. 10, an embodiment of flash translation layer (FTL) function 616 of FIG. 6 is generally indicated by the reference number 1000 and shown as a flow diagram for managing a flash translation layer relating to the nonvolatile memory of one of the modules of the present disclosure. The FTL function services main controller commands by finding the physical location for data based on a logical address provided in the command. In this regard, it noted with reference to FIG. 6 that the activities of wear leveling function 610, garbage collection function 612 and bit density configuration function 614 cause physical placement of stored data in a module to be dynamic. Accordingly, the FTL function is more complex than just a logical to physical address conversion for a static physical placement, but rather uses parameters generated from the other functions to determine dynamic FTL data structures corresponding to data placement in sections, blocks, and pages, so that active data units can always be located based only on their corresponding logical addresses. It is noted that these dynamic data structures can be stored in table area 620 of FIG. 6.

An FTL parameters section 1002, which can form part of shared parameter section 322 (FIG. 3) of the function engine, receives parameters from the main controller at 1004 and module parameters from the module at 1006. The values of these parameters can influence a relative degree of customization of the FTL function by the main controller as opposed to the amount of customization that is exerted by the module. As is the case with other functions, as discussed above, some parameter values can cause the main controller to have greater influence on the FTL relative to the module while other parameters tend to favor influence by the module. Irrespective of the degree of influence by either the main controller or the module, the function engine can perform the FTL function, for example, autonomously based only on parameter inputs.

FTL parameter section 1002 also receives information produced by: wear leveling function 700 (FIG. 7) at 1010; garbage collection function 800 (FIG. 8) at 1012; and bit density configuration function 900 (FIG. 9) at 1014. An initialization branch 1020 of the FTL function executes prior to the first use of the module and before any access by the main controller in any execution of user data storage operation. At 1024, input 1010 from the wear leveling function and input 1014 from the bit density configuration function, as reflected by FTL parameter section 1002, allow the construction of initial data structures starting with the creation of logical table entries. These data structures can be multi-level in nature so as to provide mappings at the section, block and page levels. The mappings are also dynamic in nature since it necessarily intended they be modified as new data is written into the module and as previously written data is either invalidated due to overwrite or erased.

At 1028, logical to physical map entries are created for each logical address such that a physical location corresponds to each logical entry in the data structure. Because the initialization branch occurs before actual data is written into the module, the logical entries designate already-allocated, but still empty, areas in the module memory. Accordingly, the data structures at this point can refer to a set of sections which form a memory volume that will be accessible to the main controller, which as yet contains no data. It is a task of subsequent read, write and erase functions to augment these data structures with connections between logical data blocks and physical blocks and pages within the volume.

Following initialization, at 1030, normal operation is entered wherein the memory is accessible for storing data. It is noted that read, write and erase operations are described insofar as their interactions with the FTL function. One of ordinary skill in the art will be familiar with other aspects of these operations. A read branch 1034 of the function can execute responsive to a read command whereas at 1036 an erase/write branch of the function can execute responsive to a write command or an erase command, as will be further described.

It should be appreciated that read branch 1034 is not required to update FTL data structures since read operations do not alter stored data. Thus, at 1038, the read branch returns a physical address for each logical address submitted to it. Hence, when the module receives a read data command from the main controller, the resulting call to the FTL function involves only a physical address look-up operation. More than one pass through the read branch can occur responsive to a single read command, because the data requested in the read command can be comprised of data residing at multiple logical addresses.

Erase/Write branch 1036 can be executed either when a previously unwritten data block is being written, or when the data residing at a currently written logical address is being overwritten. In the former case, the logical address or addresses must be assigned to physical locations in the memory; this necessarily requires physical memory to be designated from within existing sections to specific blocks and pages. As many passes through the erase/write branch as necessary can be executed in order to assign all data to be written by the command to corresponding physical locations. At 1040, physical memory for a write operation can be allocated. At 1042, the FTL tables are updated to reflect the write operation. If an erase operation is needed, in the latter case, step 1040 can account for erasure of the subject memory locations in order to invalidate data previously written to the physical address(es) corresponding to the logical address(es). Step 1042 can then update the FTL tables to designate the subject memory locations as containing invalid data preparatory to the write function. The FTL erase function can be performed in conjunction with a write command or an erase command from the main controller to the module. The FTL erase function of erase/write branch 1036 does not accomplish physical erasure of the corresponding logical address, but rather updates table structures to show that the correspondence between the logical address and physical location is no longer valid. Thus, a first pass through erase/write branch 1036 can account for the erasure in terms of the FTL structure, while a second pass can account for a corresponding write operation. Table entries can later be updated by garbage collection function 612 as it identifies obsolete physical data units, and performs physical block erasures to return the affected physical data units to availability for subsequent writing. Normal operation proceeds at 1044.

Figure 11:
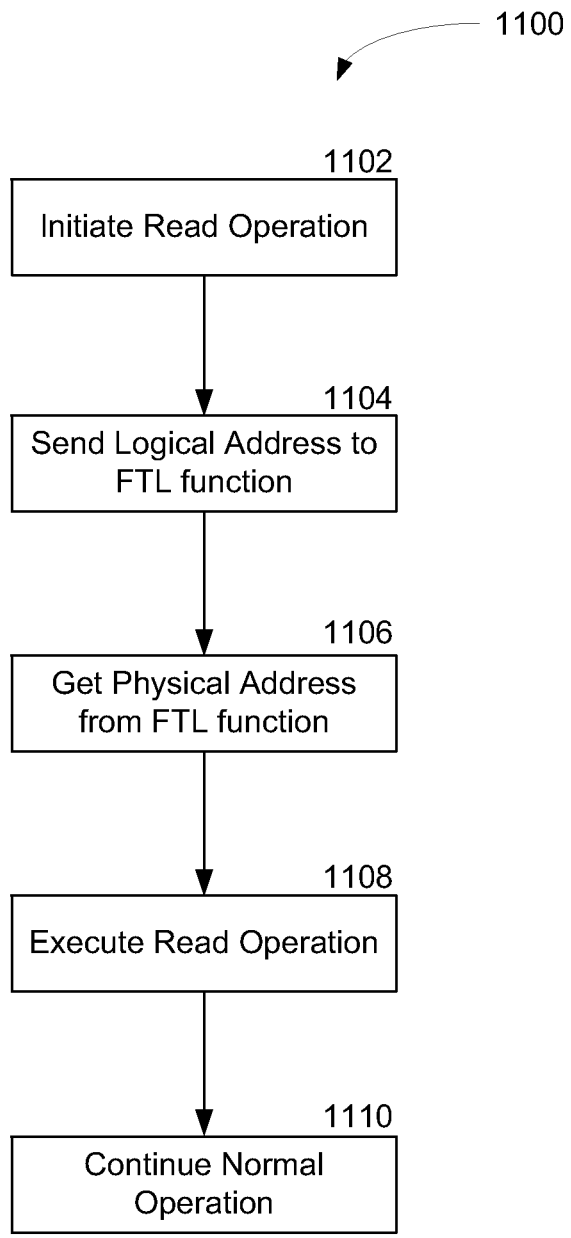
FIG. 11 is a flow diagram which illustrates an embodiment of a read operation that can be performed in cooperation with the function engine of FIG. 6.

Turning now to FIG. 11, an embodiment of a read operation is shown in the form of a block diagram and is generally indicated by the reference number 1100, for purposes of illustrating the supplemental interaction of the read operation with function engine 320 (FIG. 6). At 1102, the read operation is initiated. It is noted that the mechanics of the read operation, insofar as accessing and reading individual memory cells, will be familiar to one of ordinary skill in the art and a wide variety of suitable processes can be employed for this purpose. Each read operation has been directed to a logical address. The logical address may have been obtained externally from a host as part of a command to perform a read, or it may have been obtained internally to a module. In any case, at 1104, before actual data can be read, the read operation sends the logical address to FTL function 616 (FIGS. 6 and 10). At 1106, FTL function 616, in response to receiving a logical address from the read operation, returns a physical address to the read function. Because this is a read operation, updates to FTL tables in table section 620 (FIG. 6), as well as the wear leveling and garbage collection functions should not be required because no changes to the memory are being made. Having obtained a physical address, at 1108, the read operation executes so as to obtain read data. While FIG. 11 appears to refer to the read operation, based on the exchange of a single logical or physical address for purposes of descriptive clarity, it should be appreciated that a read operation can involves multiple addresses. Thus, the various steps of the read operation that have been illustrated can involve multiple logical to physical address translations with a corresponding read step to each of the physical addresses. At 1110, the read operation is complete and normal operation resumes.

Figure 12:
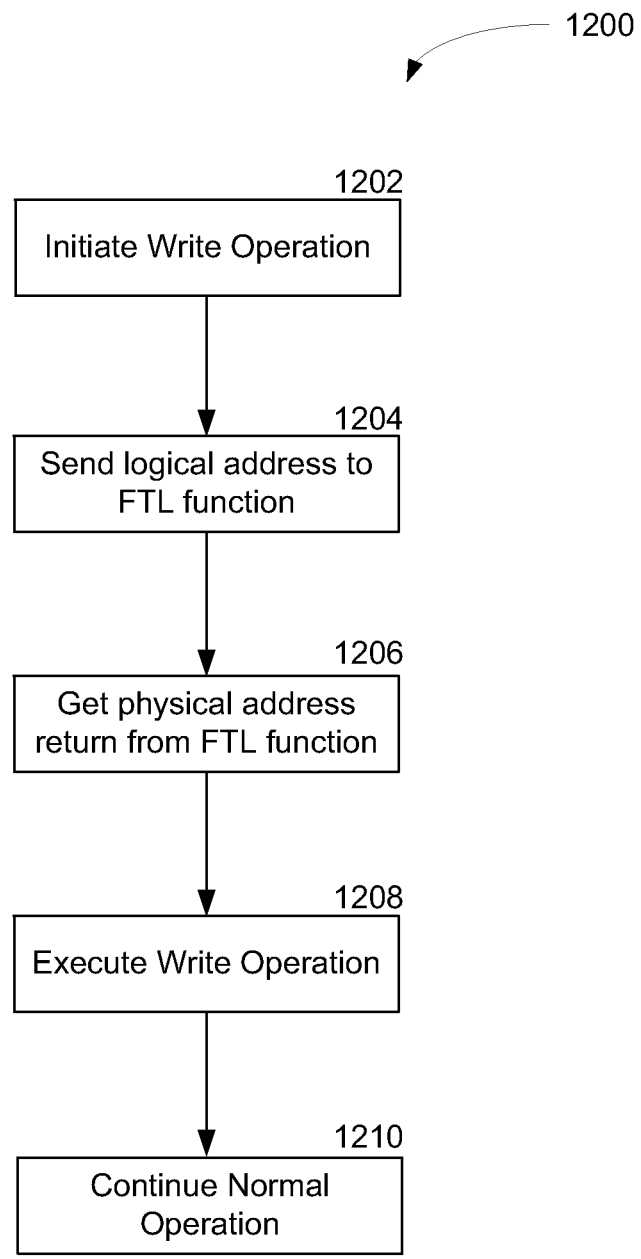
FIG. 12 is a flow diagram which illustrates an embodiment of a write operation that can be performed in cooperation with the function engine of FIG. 6.

Referring to FIG. 12, an embodiment of a write operation is shown in the form of a block diagram and is generally indicated by the reference number 1200, for purposes of illustrating the supplemental interaction of the write operation with function engine 320 (FIG. 6). At 1202, the write operation is initiated. It is noted that the mechanics of the write operation, insofar as accessing and writing to individual memory cells, will be familiar to one of ordinary skill in the art and a wide variety of suitable processes can be employed for this purpose. A write operation results in some extent of memory being written. Such an operation can be to a previously unwritten logical address or it can be to a currently written logical address. In either case, the write operation, at 1204, sends the target logical address to FTL function 616 (FIGS. 6 and 10). The FTL function responds, at 1206 by returning a physical address to which write data will be physically written into the memory. Whether the write is new (to a previously unwritten logical address) or an over-write (targeting a currently written logical address), the FTL function returns a physical address to be written. Either case results in an update to the FTL configuration by the FTL function that will be visible to wear leveling function 610 (FIGS. 6 and 7) and garbage collection function 612 (FIGS. 6 and 8). At 1208, responsive to the return of a physical address for use by the write operation, the write operation is executed. It should be appreciated that, while FIG. 12 appears to refer to the write operation based on the exchange of a single logical or physical address for purposes of descriptive clarity, a write operation can involve multiple addresses. Thus, the various steps of the write operation that have been illustrated can involve multiple logical to physical address translations with a corresponding write step for each of the physical addresses. Likewise, FTL, wear leveling, and garbage collection parameters are updated to reflect the multiple physical addresses written by the write operation. At 1210, normal operation resumes.

Figure 13:
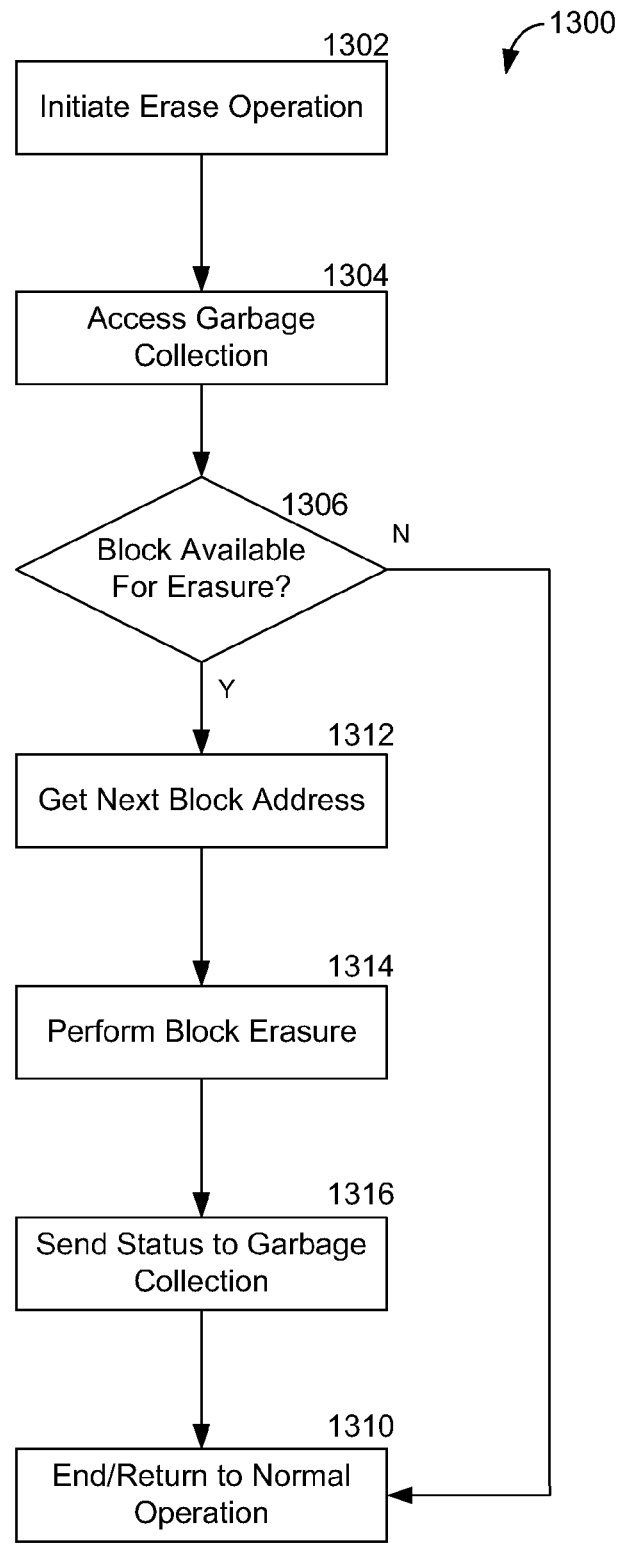
FIG. 13 is a flow diagram which illustrates an embodiment of an erase function that can be performed in cooperation with the function engine of FIG. 6.

Referring to FIG. 13, an embodiment of an erase operation is shown in the form of a block diagram and is generally indicated by the reference number 1300, for purposes of illustrating the supplemental interaction of the erase operation with function engine 320 (FIG. 6). At 1302, the erase operation is initiated. It is noted that the mechanics of the erase operation, insofar as accessing and erasing individual memory cells, will be familiar to one of ordinary skill in the art and a wide variety of suitable processes can be employed for this purpose.

The result of the erase operation that is shown here is the physical erasure of an extent of memory. As such, this operation differs from a logical erasure as might result from an erase command sent from the host, although a host erase command ultimately invokes this operation. Also as such, such a physical erasure is likely to be directed from within the module rather than from the host.

Referring to FIGS. 6 and 13, at 1304, the current garbage collection configuration parameters are accessed for example from table section 620 of the function engine (FIG. 6) to obtain a physical block location to be erased (if available). The identification of such physical locations for erasure can be generated by garbage collection function 612 (FIG. 6). At 1306, a determination is made as to whether a block is available for erasure. If no such block address is currently available, the erase procedure ends at 1310 with a return to normal operation. If a block address is available, the erase procedure advances to 1312 for purposes of obtaining the next block address that is available for erasure as specified by the garbage collection function. At 1314, the erase function executes the erase operation to access and erase the block at the physical address obtained in 1312. After the erasure has been completed, operation moves to 1316 which provides completion status to garbage collection function 612, for example, via table section 620. In an embodiment, the completion status can be provided directly to the garbage connection function which, in turn, enables the garbage collection function to update its configuration. At 1310, the erase operation ends with a return to normal operation status.

Referring to FIGS. 3 and 6, each module 30 can be configured for operation in various modes responsive to controller parameters 630. In an embodiment, a module can operate in a first mode for a selected one of the functions based on a first set of the module input parameters from the controller and operate in a second mode for the selected function based on a second set of module input parameters from the controller with the first set of module input parameters being different from the second set of module input parameters. The parameter sets can be stored, for example, by shared parameter section 322. A module can be configured, by way of example, to apply the first mode to a first portion (e.g., section) of the given nonvolatile memory section of the module and to apply the second mode to a second portion (e.g., section) of the given nonvolatile memory section based on the module input parameters with the first portion being different from the second portion. Thus, in FIG. 5, NVM 1 (section 502) can be configured to store data at a first bit density while NVM 2 and NVM 4 (section 504) can be configured to store data at a second bit density that is different from the first bit density based on input parameters. In an embodiment, the portions of the overall nonvolatile memory can be determined based on controller parameters 630 while the bit densities can be determined based on one or more module parameters (e.g., monitored characteristics) of the nonvolatile memory of the module. In some embodiments, the module parameters can be error correction statistics that are generated, for example, by a decoder, as will be further described below.

In some embodiments, one or more modules can operate in a first mode for a selected one of the functions based on a first set of the module input parameters from the controller via shared parameter section 322 (FIGS. 3 and 6) such that each module, so configured, performs the function, for example, autonomously with no oversight from or interaction with the controller and operate in a second mode for the selected function based on a second set of module input parameters from shared parameter section 322 with the first set of module input parameters being different from the second set of module input parameters such that each module, so configured, performs the function in the second mode under at least partial control from the controller. For example, in the first mode, a module can autonomously manage a flash translation layer within table area 620 (FIG. 6) independent of the controller such that the local flash translation layer can be accessed by the controller but not altered while, in the second mode, a module can manage the module portion of an overall flash translation layer with some contribution from the controller such as, for example, causing changes in the module portion of the module flash translation layer since the controller has visibility to the flash translation layers of all the various modules.

As discussed above with regard to FIG. 5, the present disclosure provides for block abstraction that can bridge across page boundaries. Further details with respect to block abstraction will now be provided by taking initial reference to FIG. 14. The latter is a diagrammatic illustration of a physical page 1402 that is provided by a typical nonvolatile memory in relation to a first user data block 1404 that is shorter than physical page 1402 as well as a second user data block 1406 that is longer than physical page 1402 wherein length represents an associated amount of data. As discussed above, the prior art generally imposes an exact match between physical page size and block size. In instances where a block is shorter than a page, filler bits can be used to fill empty space in an unfilled page, however, in an instance where a block is longer than the page, the block is not storable under the conventional constraints of the prior art. For storage under these circumstances in the prior art, at least some portion of each and every page will be unused with the size of the unused portion depending on the degree of mismatch between the block size and the larger page size. Thus, a page-sized unit of user data in the prior art case is a very specific amount of data. Each of the user data blocks of FIG. 14, however, are different in length than the physical page that is shown. In the case of a user data block that uses less than the total number of cells in the physical page, the prior art is able to cope with the situation since the block fits into one physical page, even though there are unused cells and therefore a loss in storage efficiency. When the user data block exceeds the extent of the physical page, the prior art is not able to cope with the situation since it is not possible to fit the user block into a single physical page.

The present disclosure, however, sweeps aside the constraints of the prior art by storing blocks of information in non-volatile memory devices without having to size each block to fit into a single physical page. For example, user data blocks can be allocated to physical memory irrespective of how many spare bits each physical page includes. In this regard, it should be appreciated that each page is generally allocated with spare bits that can be directed, for example, to parity data, and metadata of various forms, including but not limited to logical block addresses, and miscellaneous flags, pointers and counters which can be used by the FTL, wear leveling, and garbage collection functions. Through the teachings herein, the combined user data bits plus spare bits in each physical page effectively all become storage space in each page without regard to use as user data, ECC parity or metadata. Thus, no differentiation is made in the user data blocks of FIG. 14 between actual user data and overhead data. A block of user information with associated overhead, however, can be smaller than physical page 1402, as is the case with first user data block 1404, or larger than physical page 1402, as is the case with second user data block 1406. As will be seen, in either case, a multiple user-block sequence can be fitted to a group of physical pages with no correspondence between the number of user blocks and the number of physical pages. By way of non-limiting example, a user data block can be defined as one or more 512-byte units (sectors) with associated overhead; whether a block is made up of one sector or multiple sectors is not of significance since the block can be of any desired size. The origin (e.g., starting) point of each block within a particular page is characterized by an offset which is designated. Tracking of the offset can be implemented in firmware, hardware, or any suitable combination of both. When a user block extends beyond one physical page, a remaining portion of the block is allocated to a subsequent physical page. When this happens, the location of the break within the user block is tracked by the application in the same way that user block origins are tracked, as will be discussed in further detail below.

Attention is now directed to FIG. 15 which is a block diagram, generally indicated by the reference number 1500, diagrammatically illustrating four successive physical pages PP1-PP4 forming part of a nonvolatile memory. In being successive physical pages, this set of physical pages can be physically addressed in a successive manner, for example, by incrementing the physical address by a given amount from one page to the next. In this example, user data blocks B1-B4 are used, each having a length as exemplified by first user data block 1404 of FIG. 14 wherein the user data block is shorter than the physical page. For purposes of illustrative clarity, it is assumed that a block length BL is equal to 0.75 of a page length PL. As seen, block B1 is completely contained by physical page PP1. Block B2 includes a first portion 1510 stored in a final quarter of physical page PP1 at an offset from the beginning of the page that corresponds to the length of block B1 (i.e., ¾ PL) and a second portion 1512 that is stored in physical page PP2, starting from the beginning of PP2 so as to fill the first half of PP2 and representing the final ⅔ of block B2. An initial portion 1520 of block B3 is stored in the second half of physical page PP2 at an offset of ½ PL from the beginning of PP2 while a final ⅓ portion 1522 of block B3 is stored in the first ¼ of physical page PP3. Block B4 fills a remaining portion 1524 of physical page PP3. Block B5 then fills an initial ¾ portion 1526 of physical page PP4 at an offset of ¼ PL from the beginning of PP4. A final ¼ portion 1528 of PP4 is shown as empty, however, it can be filled by a portion of a subsequent block or remain empty. In the present example, five user blocks are stored on four physical pages. As can be seen, physical pages can be completely utilized even though the block length is shorter than the page length. Moreover, blocks can be stored in a manner that bridges page boundaries. Storage, as exemplified by FIG. 15, can continue for an arbitrary number of user data blocks, or until the last user data block in a sequence is stored. In some cases, the last physical page in a sequence can contain unused memory cells, but all prior physical pages can be completely utilized with a net increase of efficiency, as compared to the prior art case.

FIG. 16 is a block diagram, generally indicated by the reference number 1600, diagrammatically illustrating four successive physical pages PP1-PP4 forming part of a nonvolatile memory. In this example, user data blocks B1-B3 are used, each having a length as exemplified by second user data block 1406 of FIG. 14 wherein the user data block is longer than the physical page. The prior art, of course, is incapable of storing the relatively longer blocks. For purposes of illustrative clarity in the present example, it is assumed that block length BL is equal to 1.25 of page length PL. As seen, an initial block B1 is partially contained by physical page PP1 with a final portion 1610 (20 percent) of B1 contained by physical page PP2. An initial portion 1612 of block B2 fills the remainder of physical page PP2 at an offset of ¼ PL from the beginning of PP2 and a final portion 1614 of block B2 fills the first 50 percent of physical page PP3. An initial portion 1616 of block B3 fills the final 50 percent of physical page PP3 at an offset of ½ PL from the beginning of PP3 and a final portion 1618 of block B3 fills an initial 75 percent of physical page PP4. The final 25 percent of PP4 is unused if no more blocks are available or can be used by a subsequent block. In the present example, three user blocks are stored on four physical pages. Physical pages can be completely utilized even though the block length is longer than the page length. Again, blocks can be stored in a manner that bridges page boundaries. In this regard, any relationship of the user data block size to the physical page size can be accommodated based on the teachings that have been brought to light herein. The flexibility that is provided can increase or maximize storage efficiency over what is possible in the prior art. Such flexibility provides the ability to change user block sizes such as, for example, to add ECC parity to the user block format without requiring a corresponding increase in the size of the physical page in a given memory. Storage efficiency can be optimized by a tendency to fully utilize physical page resources in a given memory device.

Figure 17:
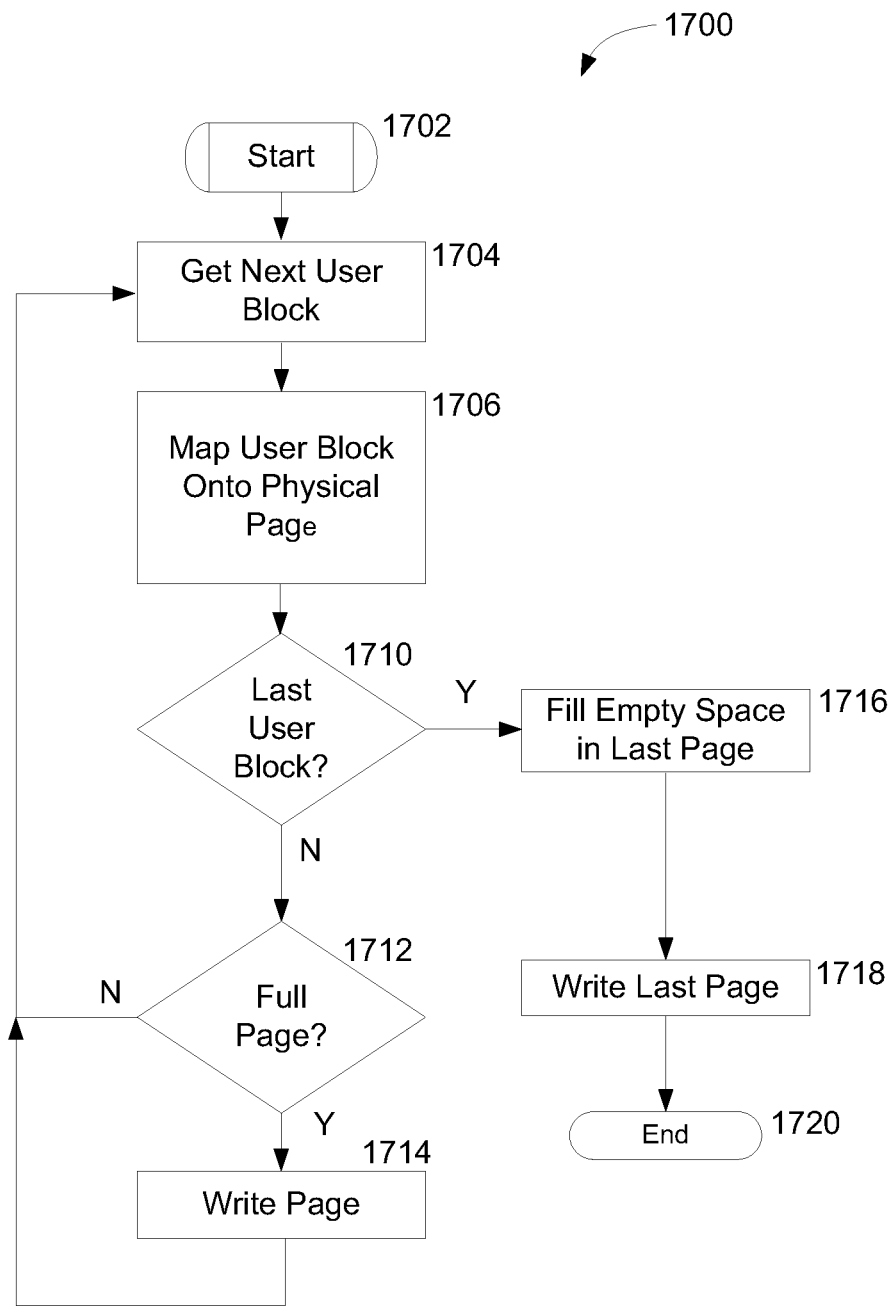
FIG. 17 is a flow diagram which illustrates an embodiment of a method for storing/writing user data blocks in a way which achieves the data structures described in the context of FIGS. 15 and 16 and in which the block length and page length can be different.

FIG. 17 is a flow diagram, generally indicated by the reference number 1700, which illustrates an embodiment of a method for storing/writing user data blocks in a way which achieves the data structures described above in the context of FIGS. 15 and 16. Initially, it is noted that a sequence or series of user data blocks comprising the write operation is receivable by the process, as illustrated by FIGS. 15 and 16, wherein the block length and page length can be different. The method begins at 1702 and moves to 1704 which retrieves an initial user data block at the outset of the process. At 1706, the current user data block is mapped onto a physical page at some offset from the beginning of the physical page which can be a zero or non-zero offset value. The offset can be stored, for example, as a value in prior block metadata or as an address contained in tables created and used by the FTL function. At 1710, a determination is made as to whether the current user data block is the last block in the write transfer. If not, operation proceeds to 1712, which tests whether the current page is now full. If the current page is full, operation transfers to 1714 which then writes the page. Operation then returns to 1704. At 1712, if the page is not full operation returns to 1704. Returning again to 1710, if the last user block is detected, operation proceeds to 1716 which fills any remaining space in the current page, if present. At 1718 the last page is written and operation concludes at 1720 pending the next write operation.

Figure 18:
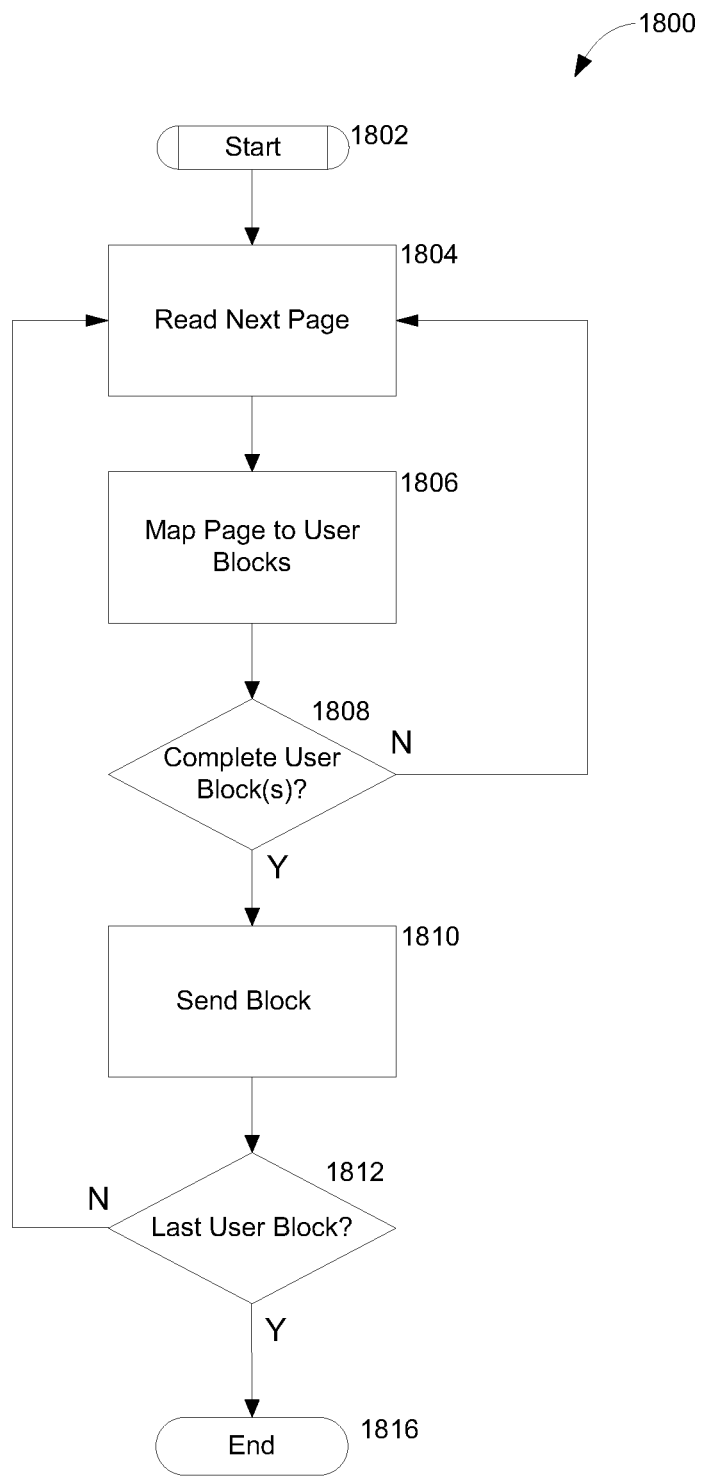
FIG. 18 is another flow diagram which illustrates an embodiment of a method for reading user data blocks from the data structures described above in the context of FIGS. 15 and 16 and in which the block length and page length can be different.

FIG. 18 is another flow diagram, generally indicated by the reference number 1800, which illustrates an embodiment of a method for reading user data blocks from the data structures described above in the context of FIGS. 15 and 16 and in which the block length and page length can be different. The method begins at 1802 and moves to 1804 which retrieves an initial physical page at the outset of the process. At 1806, the retrieved page is mapped to user blocks such that the user blocks are recovered. The mapping, for purposes of retrieving the user blocks can be based, for example, on offsets created during the write operation (FIG. 17) and stored as metadata with a prior block or as addresses stored in tables created and used by the FTL function. A test is made at 1808 to determine if the recovery of user data blocks is complete. If the recovery is complete, recovered blocks are transferred at 1810. On the other hand, however, it should be appreciated that 1808 may identify a user data block is incomplete due to wrapping of the block from one physical page to the next physical page (see, for example, block B2 in FIG. 15 and block B1 in FIG. 16). In this case, operation returns to 1804 for purposes of reading the next page which will contain the remainder of the incomplete block. Mapping 1806 will reassemble the incomplete block and pass the now complete block on to send block 1810. At 1812, a test determines whether the last user block of the current read operation has been recovered. If not, operation returns to 1804 to read the next page. If the last user block has been recovered, the current read operation ends at 1816, awaiting the next read operation.

In view of the foregoing, a highly flexible read/write arrangement and associated method are provided for use in accessing at least one solid state memory device in read/write operations with the memory device being made up of a plurality of memory cells which memory cells are organized as a set of pages that are physically and sequentially addressable with each page having a page length such that a page boundary is defined between successive ones of the pages in said set. The system provides a control arrangement that is configured for storing and accessing a group of data blocks that is associated with a given write operation in a successive series of the pages such that at least an initial page in the series is filled and where each block of the group can include a block length that is different than the page length. It should be appreciated that at least one of the blocks can be stored at an offset from any page boundary. In the instance of a series of physical pages having an initial group of two or more pages and a final page, the system can fill at least each page of the initial group of pages based on the group of data blocks. The final page can be filled or partially filled. If the final page is partially filled, the available space can be filled by at least a portion of another block. Physical pages can contain one or more block boundaries with the start of blocks identified, for example, by offsets from the beginning of the physical page. Stated in a slightly different way, a particular block in a group of data blocks can be stored such that a first portion of the particular block is stored in a first page and a second portion of the particular block is stored in a second page such that storage of the particular block crosses a page boundary between the first page and the second page. For purposes of this discussion, the first page and second page can be any two adjacent physical pages within the data structures of FIGS. 15 and 16.

It should be appreciated that the SSD of the present disclosure and the associated modules described in detail herein, provide a system with distributed functionality that decentralizes activity that, in prior art approaches, tends toward being highly centralized. The attribute of scalability is more easily attained with decentralized (distributed) functionally than with centralized functionality. That is, distributed components with decentralized functionality, such as the modules previously described, provide for limited incremental addition of system overhead as a given system is scaled up. In contrast, a centralized system must increase the capability of its centralized controller as additional as system complexity increases with the addition of storage devices. With centralized embedded microprocessors and embedded software, the ability to manage resources becomes limited by the constraints of the computational and other abilities of a central controller. Hence scalability as an attribute is easier to achieve for systems that add functionality at lower levels of their functional hierarchies as compared with systems that attempt to add the same functionality as a centralized capability.

The foregoing description of the invention has been presented for purposes of illustration and description. It is not intended to be exhaustive or to limit the invention to the precise form or forms disclosed, and other modifications and variations may be possible in light of the above teachings wherein those of skill in the art will recognize certain modifications, permutations, additions and sub-combinations thereof.

What is claimed is:

1. A read/write apparatus for use in accessing at least one nonvolatile memory device in read/write operations with the memory device being made up of a plurality of memory cells which memory cells are organized as a set of pages that are physically and sequentially addressable with each page having a page length such that a page boundary is defined between successive ones of the pages in the set, said read/write apparatus comprising:
a control apparatus configured for
retrieving an initial page to access at least one portion of one data block of a group of data blocks that is associated with a prior write operation stored in a subset of the pages including an initial group of two or more pages and a final page such that at least each page of the initial group of pages is filled based on the group of data blocks without writing a header to each page of the initial group of pages and the final page, and each data block of the group includes a block length that is different than the page length;
detecting the presence of an incomplete data block in the initial page;
responsive to detecting the incomplete data block, retrieving an additional page from the memory device; and
mapping the additional page to complete the incomplete data block.

2. The read/write apparatus of claim 1 wherein the control apparatus is configured to retrieve at least one of the blocks at an offset from any page boundary.

3. The read/write apparatus of claim 1 wherein the control apparatus is configured to store at least a particular page in the initial group of pages such that the particular page includes at least a final portion of a first data block and at least an initial portion of a second data block, and the particular page contains a boundary between the first data block and the second data block.

4. The read/write apparatus of claim 3 wherein the control apparatus is configured to establish an offset of the second data block in the particular page.

5. The read/write apparatus of claim 3 wherein the control apparatus is configured to store a particular block in the group of data blocks such that a first portion of the particular block is stored in a first page and a second portion of the particular block is stored in a second page such that storage of the particular block crosses a page boundary between the first page and the second page.

6. The read/write apparatus of claim 4 configured to maintain a translation layer at least for the nonvolatile memory and for designating the offset in the translation layer.

7. The read/write apparatus of claim 6 including a table for maintaining the translation layer therein and the table is external to the non-volatile memory device.

8. A memory system including the read/write apparatus of claim 4 and further comprising a module which includes the nonvolatile memory device and a controller in data communication with the module.

9. The memory system of claim 8 wherein the module is configured to maintain a translation layer at least for the nonvolatile memory and to designate the offset in the translation layer.

10. The memory system of claim 9 wherein the translation layer is limited to address translations relating to the nonvolatile memory of the module.

11. The memory system of claim 9 wherein the translation layer is directed by the controller with the controller providing at least one of a parameter and a command to the module.

12. The read/write apparatus of claim 1 wherein the memory device includes NAND flash memory.

13. The read/write apparatus of claim 1 including a garbage collection function for identifying the successive series of pages for storing the group of data blocks.

14. The read/write apparatus of claim 1 wherein the block length is greater than the page length such that the initial page holds no more than the one portion of the one data block as the incomplete data block and the additional page holds at least a remaining portion of the incomplete data block.

15. The read/write apparatus of claim 14 wherein the additional page is adjacent to the initial page.

16. A method for accessing at least one non-volatile memory device in read/write operations with the memory device being made up of a plurality of memory cells which memory cells are organized as a set of pages that are physically and sequentially addressable with each page having a page length such that a page boundary is defined between successive ones of the pages in the set, said method comprising:
retrieving an initial page to access at least a portion of one data block of a group of data blocks that is associated with a prior write operation stored in a subset of the pages including an initial group of pages based on the group of data blocks without writing a header to each page of the initial group of pages and the final page such that at least each page of the initial group of pages in the subset is filled and each data block of the group includes a block length that is different than the page length;
detecting the presence of an incomplete data block in the initial page;
responsive to detecting the incomplete data block, retrieving an additional page from the memory device; and
mapping the additional page to complete the incomplete data block.

17. The method of claim 16 wherein mapping comprises retrieving at least one of the blocks at an offset from any page boundary.

18. The method of claim 16 including, during the prior write operation, storing at least a particular page in the initial group of pages such that the particular page includes at least a final portion of a first data block and at least an initial portion of a second data block, and the particular page contains a boundary between the first data block and the second data block.

19. The method of claim 18 including establishing an offset of the second data block in the particular page.

20. The method of claim 18 including, during the prior write operation, storing a particular block in the group of data blocks such that a first portion of the particular block is stored in a first page and a second portion of the particular block is stored in a second page such that storage of the particular block crosses a page boundary between the first page and the second page.

21. The method of claim 19 including maintaining a translation layer at least for the nonvolatile memory and designating the offset in the translation layer.

22. The method of claim 21 wherein maintaining includes storing the translation layer in a table that is external to the non-volatile memory device.

23. The method of claim 21 including providing a module that includes the nonvolatile memory device and a controller in data communication with the module and maintaining the translation layer in the module.

24. The method of claim 23 including limiting the translation layer to address translations relating to the nonvolatile memory of the module.

25. The method system of claim 23 including directing the translation layer using the controller with the controller providing at least one of a parameter and a command to the module.

26. The method of claim 16 wherein the memory device includes NAND flash memory, and the storing and accessing is based on a set rules for using NAND flash memory.

27. The method of claim 16 including performing a garbage collection function to identify the successive series of pages for storing the group of data blocks.

28. The method of claim 16 wherein the block length is greater than the page length such that no more than the one portion of the one data block is retrieved from the initial page as the incomplete data block and mapping comprises recovering the remaining portion of the incomplete data block from the additional page.

29. The method of claim 28 further comprising locating the additional page adjacent to the initial page.

30. A read/write apparatus for use in accessing at least one nonvolatile memory device in read/write operations with the memory device being made up of a plurality of memory cells which memory cells are organized as a set of pages that are physically and sequentially addressable with each page having a page length such that a page boundary is defined between successive ones of the pages in the set, said read/write apparatus comprising:
a control apparatus configured for
retrieving an initial page to access at least one portion of one data block of a group of data blocks that is associated with a prior write operation stored in a subset of the pages including an initial group of two or more pages and a final page such that at least each page of the initial group of pages is filled during the prior write operation based on the group of data blocks without writing a header to each page and each data block includes a block length that is different than the page length;
detecting the presence of an incomplete data block in the initial page;
responsive to detecting the incomplete data block, retrieving an additional page from the memory device; and
mapping the additional page to complete the incomplete data block.

31. A method for accessing at least one non-volatile memory device in read/write operations with the memory device being made up of a plurality of memory cells which memory cells are organized as a set of pages that are physically and sequentially addressable with each page having a page length such that a page boundary is defined between successive ones of the pages in the set, said method comprising:
retrieving an initial page to access at least a portion of one data block of a group of data blocks that is associated with a prior write operation stored in a subset of the pages including an initial group of two or more pages and a final page and filling at least each page of the initial group of pages based on the group of data blocks without writing a header to each page during a prior write operation and each data block of the group includes a block length that is different than the page length;
detecting the presence of an incomplete data block in the initial page;
responsive to detecting the incomplete data block, retrieving an additional page from the memory device; and
mapping the additional page to complete the incomplete data block.

* * * * *

UNITED STATES PATENT AND TRADEMARK OFFICE
CERTIFICATE OF CORRECTION

| | | |
|---|---|---|
| PATENT NO. | : 8,626,989 B2 | Page 1 of 1 |
| APPLICATION NO. | : 13/019969 | |
| DATED | : January 7, 2014 | |
| INVENTOR(S) | : Stephen P. Van Aken | |

It is certified that error appears in the above-identified patent and that said Letters Patent is hereby corrected as shown below:

On the Title Page, Item (74), in "Attorney, Agent, or Firm", in column 2, line 1, delete "Pritzkou" and insert -- Pritzkau --, therefor.

In the Claims

In column 39, line 62, in Claim 25, after "method" delete "system".

Signed and Sealed this
First Day of April, 2014

Michelle K. Lee
*Deputy Director of the United States Patent and Trademark Office*